US012086775B2

(12) United States Patent
Turner et al.

(10) Patent No.: US 12,086,775 B2
(45) Date of Patent: Sep. 10, 2024

(54) PRESENTING INTERACTION HISTORY INCLUDING CONTEXT INFORMATION ON A USER INTERFACE

(71) Applicant: Stodge Inc., Scottsdale, AZ (US)

(72) Inventors: Colin Douglas Turner, Scottsdale, AZ (US); Steadman Stoness Dinning, Puslinch (CA); Owen David Romano, Aurora (CA); David Dennison Lacho, Winnipeg (CA); Alexander Nathan Seibel, Austin, TX (US); Mark Robert Sullivan, Chicago, IL (US); Rohan Bhatia, Toronto (CA); Nicole Marie Perry, Oakland, CA (US); Evan Andrew Romano, Phoenix, AZ (US); John Barott Fox, Denver, CO (US); Tyler Jameson Reiff, St. Petersburg, FL (US); Nathan Patrick Killea, Greensboro, NC (US)

(73) Assignee: Stodge Inc., Scottsdale, AZ (US)

( * ) Notice: Subject to any disclaimer, the term of this patent is extended or adjusted under 35 U.S.C. 154(b) by 0 days.

(21) Appl. No.: 18/112,427

(22) Filed: Feb. 21, 2023

(65) Prior Publication Data

US 2024/0273494 A1 Aug. 15, 2024

Related U.S. Application Data

(60) Provisional application No. 63/445,251, filed on Feb. 13, 2023.

(51) Int. Cl.
*G06Q 30/00* (2023.01)
*G06Q 20/12* (2012.01)
*G06Q 30/0207* (2023.01)

(52) U.S. Cl.
CPC ....... *G06Q 20/123* (2013.01); *G06Q 30/0222* (2013.01); *G06Q 30/0224* (2013.01)

(58) Field of Classification Search
None
See application file for complete search history.

(56) References Cited

U.S. PATENT DOCUMENTS 5,956,024 A * 9/1999 Strickland .............. G06Q 30/02 715/717
10,671,248 B2 * 6/2020 Muramoto .............. H04L 51/52
(Continued)

FOREIGN PATENT DOCUMENTS

WO WO-2014145149 A1 * 9/2014 ............. G06Q 30/01
WO WO-2018009432 A1 * 1/2018 ......... G06F 16/2237

OTHER PUBLICATIONS

Awoyelu, I. O. "Development of a Real-time Customer Service System." International Journal of Computing & ICT Research 6.1 (2012). (Year: 2012).*

*Primary Examiner* — Michael Bekerman
(74) *Attorney, Agent, or Firm* — Fenwick & West LLP

(57) ABSTRACT

A message including metadata is received on behalf of an application operator from a subscriber by a message management platform. Based on the metadata, the message is determined to be associated with a customer record received by the message management platform as an application programming interface (API) notification from an application builder platform. The API notification includes a payload that includes information describing a committed transaction event associated with a user of the application builder platform. An interaction history associated with the subscriber is presented in a messaging interface of the message management platform. The interaction history includes the message received from the subscriber and further including (Continued)

a user action item describing the committed transaction event associated with the user of the application builder platform.

29 Claims, 9 Drawing Sheets

(56) References Cited

U.S. PATENT DOCUMENTS

| | | | | |
|---|---|---|---|---|
| 11,887,178 | B1 * | 1/2024 | Turner | G06Q 30/0631 |
| 2008/0056480 | A1 * | 3/2008 | Isaacs | H04M 3/5133 379/265.01 |
| 2012/0072440 | A1 * | 3/2012 | Vasquez | G06Q 30/0615 709/227 |
| 2012/0166345 | A1 * | 6/2012 | Klemm | G06Q 30/016 705/304 |
| 2014/0270146 | A1 * | 9/2014 | Riahi | H04M 3/4936 379/265.13 |
| 2015/0074191 | A1 * | 3/2015 | Feng | H04L 67/55 709/204 |
| 2015/0324900 | A1 * | 11/2015 | Starikova | G06F 3/04842 705/35 |
| 2015/0324903 | A1 * | 11/2015 | Starikova | H04L 12/1831 705/35 |
| 2017/0308859 | A1 * | 10/2017 | Azmoon | G06F 3/0486 |
| 2018/0012232 | A1 * | 1/2018 | Sehrawat | H04M 3/5141 |
| 2019/0311374 | A1 * | 10/2019 | Dai | G06F 40/205 |
| 2020/0014642 | A1 * | 1/2020 | Sidi | G06Q 30/0633 |

* cited by examiner

```
                    {
                      "time_created": "2022-10-07T09:21:52",
                      "id": 3948249,    270
260                   "body": {...},
                      "description": "Order Shipped",
                      "order_id": 231098434,
                      "subject_type": "Shipment",
                      ...
                    }              262
```

```
        "body": {
272       "app_identifier" : 1249032235
274       "IP_address": 342.213.23.102
          ...
          "customer":
            {
282         "id": 207119551,
284         "email": "john.doe@abc.com",
286         "phone": "+16507778888",
            ...                                      270
            },
            ...
292       "order":
            {
294         "items" = ["item_id": 34295493, "item_id": 32546556, ...]
            ...
            }
          ...
        }
```

250

PRESENTING INTERACTION HISTORY INCLUDING CONTEXT INFORMATION ON A USER INTERFACE

CROSS REFERENCE TO RELATED APPLICATIONS

This application claims the benefit of U.S. Provisional Application No. 63/445,251, filed on Feb. 13, 2023. The content of which is incorporated herein by reference in its entirety.

TECHNICAL FIELD

The present disclosure generally relates to a server that distributes messages to recipients on behalf of application operators and, more specifically, to a response interface that displays interaction history with the recipients along with context information.

BACKGROUND

Network communications to a mass audience can often be challenging as communications channels are often associated with their own requirements, protocols, formats and limitations. An organization often encounters technical difficulties in managing proper message transmission. In addition, identification of audience and determination of proper timing to transmit the proper communications are not a trivial task. An organization may not be equipped with the technical specialty to deliver network communications in an effective manner without the proper technical specialty. The issue could be especially challenging if messages are related to functionalities that are not operated by the organization.

Figure 1:
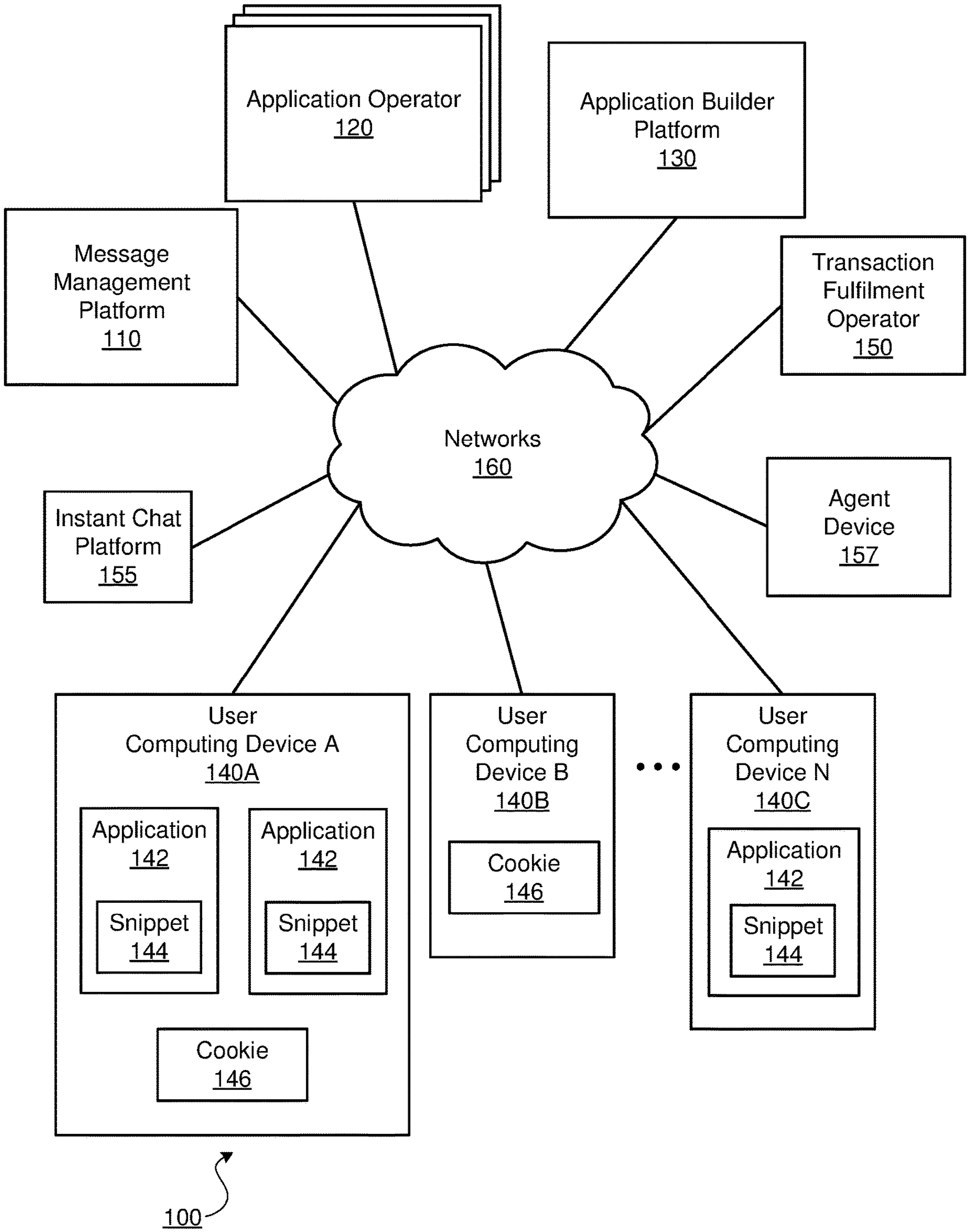
FIG. 1 is a block diagram illustrating an example system environment, in accordance with some embodiments.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

This disclosure pertains to a message management platform that orchestrates a user interface (e.g., graphical user interface, response interface, messaging interface, action interface) for presentation of the entire interaction history (e.g., chat history including user actions such as purchase actions and browsing actions and agent actions such as assigning the user to a message flow) between an application operator (e.g., e-commerce merchant) and a subscriber in the context of a timeline that is based around conversations. The user interface may further present on the interface context information in the form of context elements related to committed transactions such as items purchased, orders placed, etc.; and context elements related to uncommitted transactions such as browsing history, item added to cart, abandoned cart, etc., so that a customer service agent interacting with the subscriber via the user interface can review all pertinent information related to the interaction between subscriber and the merchant (application operator) on the same interface.

A user may click on a link (e.g., pop-up on an e-commerce webpage) that generates a message (e.g., short message service (SMS) message) on the user's device (e.g., smartphone) that the user can send to the message management platform performing various tasks related to managing communication (e.g., messages, campaigns, automations, conversions) on behalf of application operators (e.g., e-commerce merchants). By sending the message to the message management platform, the user may opt-in (e.g., subscribe) to receive messages (e.g., offers, marketing messages, promotions, discounts, deals, etc.) from the message management platform sent on behalf of a specific application operator. Alternately, a subscriber (who is already opted-in) may send a message (e.g., order related communications, customer service messages, technical support, etc.) intended for the application operator that may require resolution. The user interface may be a software as a service (SaaS) platform (e.g., offered as a product) that is managed by the message management platform and made accessible to and utilized by agents (e.g., customer service agent, salesperson) of the application operator for managing interactions with its subscribers. Alternately, the user interface may be utilized by agents of the message management platform on behalf of the application operator for managing interactions with subscribers of the application operator (e.g., offered as a service).

The message (e.g., new message, response in an existing conversation; interaction element) received by the message management platform from the subscriber may be routed to a messaging interface where a live agent (e.g., application operator agent, message management platform agent) may interact with the subscriber to achieve different goals. For example, the goal may be to resolve an issue the subscriber is having. As another example, the goal may be to get a response from the subscriber. As yet another example, the goal may be to achieve a conversion.

The response interface may be configured to make the entire interaction history between the subscriber and the application operator easily accessible by integrating data from a plurality of sources in one place and presenting the data in the context of a timeline that includes not only the chat history (i.e., messages exchanged between the subscriber and the application operator), but also action items. The action items may include subscriber or user action items, and agent action items. Subscriber action items presented in the interaction history as interaction elements may be generated as a result of and may describe actions or activities of the subscriber (e.g., committed transactions such as items purchased, orders placed, etc.; and uncommitted transactions such as browsing history, item added to cart, abandoned cart, etc.). The agent action items may be generated as a result of and may describe actions or activities of the agent acting on behalf of the application operator (e.g., routing the subscriber to a message flow, automatically sent message as part of the message flow, adding a tag to the subscriber's profile, etc.) and also presented in the interaction history as interaction elements. The subscriber action data for the committed transactions and the subscriber action data for the uncommitted transactions may be assembled from different data sources. In order to present the subscriber action items corresponding to the different data sources in the interaction history as interaction elements intermingled with interaction elements of the chat history messages, the message management platform may be configured to associate a received message from the subscriber with the different data sources. For example, the message management platform may associate the received message from the subscriber with a customer record that is managed by an application builder platform (e.g., a platform that manages back-end components of the application operator) and that is determined to correspond to the subscriber based on, e.g., the subscriber's phone number from which the message is received. In some embodiments, the message management platform may be subscribed to one or more application programming interface (API) channels (e.g., committed transaction data channels like, an order created channel, an order shipped channel, an order received channel, etc.). Based on API notifications (e.g., webhooks) received by the message management platform from the application builder platform when committed transaction events associated with the subscribed API channels occur based on user actions on the application builder platform, the message management platform may receive data corresponding to the customer record data. The message management platform may further associate the received customer record data with a message received from the subscriber, e.g., based on the phone number or other identifier, of the subscriber included in the message metadata and the phone number or other identifier, included in the customer record.

As another example, the message management platform may further be configured to associate the received message from the subscriber with uncommitted transaction data (e.g., add item to shopping cart, view a product webpage, abandon shopping cart, search for an item, browsing history, etc.) of a device browsing content hosted by the application operator (e.g., via an app or by opening a website on a web browser). For example, the agent may operate the messaging interface of the message management platform to send a message to the subscriber containing a unique link to a webpage associated with the application operator. The subscriber may click on the unique link to open the webpage in a web browser on their device (e.g., smartphone), and a code snippet incorporated in the webpage (e.g., downloaded website) on the user device may download a cookie of the message management platform to the user device (with the user's permission). The cookie may have an identifier and may track the browsing activity of the user on the website of the application operator. Based on the browsing activity tracked by the cookie, the code snippet may transmit a notification related to an uncommitted transaction event of the user device to the message management server. The notification may include an identifier of the cookie and/or an identifier corresponding to the unique link. Based on the received notification, the message management server may associate the subscriber to whom the unique link was sent to the uncommitted transaction event of the user device included in the received notification. Subsequent browsing activity (that may generate additional uncommitted transaction event data) by the subscriber on the user device may also be tracked as a result of the cookie, received via the notifications from the code snippet, and associated with the subscriber based on the identifier of the cookie that has been previously associated with the subscriber by the message management platform.

The message management platform may thus be able to present to the agent, on the same response interface, not only the interaction history between the subscriber and the merchant (including messages and user/agent action items), but also relevant contextual information like the user's committed transactions (e.g., purchase history, order history, items purchased, etc.) and the user's browsing history on the merchant's website (e.g., products viewed, items added to cart, etc.).

Further, in presenting the chronological interaction history on the messaging interface, the message management platform may be able to present not only the chat history between the subscriber and the merchant, but also other interaction elements interspersed with the chat messages and describing user actions (e.g., committed or uncommitted transaction events) based on the data received from the different sources, and/or agent actions, as an interaction history timeline. The chronological interaction history on the user interface thus gives an agent a quick view of not only the messages exchanged, but also actions taken by the subscriber (e.g., order placed, order received, item viewed, item added to cart, etc.) and/or by the (same or different) agent (e.g., add a tag to the subscriber's profile, route the subscriber to a message flow, etc.), in the same/common chronological timeline. As a result, when interacting with the subscriber using the response interface, the agent (e.g., salesperson) is able to easily contextualize the conversation with the user and provide a better user experience by knowing more about the subscriber, including past conversations with the subscriber, past products purchased, products viewed, message flows the subscriber has been added to, and the like.

The message management platform may further be configured to automatically group the interaction history timeline into a plurality of threads around specific anchors. For example, the anchors may be orders (e.g., a first thread of interaction history elements including conversations or user/agent action items corresponding to a first order, and a second thread of interaction history elements including conversations or user/agent action items corresponding to a second order). The response interface may further be configured to allow easy navigation between start of the different threads within the interaction history. For example, the response interface may enable the agent to easily navigate between the interaction elements corresponding to the start of the different threads by clicking on an interface element or a keyboard shortcut.

Example System Environment

Referring now to Figure (FIG. 1, shown is a block diagram illustrating an embodiment of an example system environment 100 for presenting an interaction history with subscribers in a response interface, in accordance with some embodiments. By way of example, the system environment 100 includes a message management platform 110, application operators 120, an application builder platform 130, user computing devices 140, and a transaction fulfillment operator 150. The user computing devices 140 may be collectively referred to by the reference number 140 or individually as 140A, 140B, . . . , 140N (N being an nth device, n being some number). The entities and components in the system environment 100 may communicate with each other through networks 160.

In various embodiments, the system environment 100 may include fewer or additional components. The system environment 100 also may include different components. Also, while some of the components in the system environment 100 may sometimes be described in a singular form, the system environment 100 may include one or more of each of the components. For example, there may be multiple application operators 120 and multiple user computing devices 140. Various application operators 120 may be independent entities such as different enterprise customers (e.g., e-commerce merchants) of the message management platform 110, which serves as a service provider that manages the message distribution and associated actions on behalf of the application operators 120. Also, while terms such as "server" and "operator" are used in the singular form, those terms may each include multiple instances that cooperatively or collectively perform certain functions or processes described in this disclosure. For example, a "server" may include a group of servers that are operated under a single entity or multiple entities under contract to provide various services. Each server in the group may perform a different function.

In the system environment 100, various components may be operated by the same organization or different organizations. For example, in some embodiments, the message management platform 110, the application operator 120, the application builder platform 130, and the transaction fulfillment operator 150 are each operated by a different business. In some embodiments, two or more components may be operated by the same organization. For example, the organization that controls the application builder platform 130 may also be the transaction fulfillment operator 150.

The message management platform 110 may include one or more computing servers that perform various tasks related to managing communication elements (messages, data payloads, and other forms of communications) on behalf of application operators 120. The message management platform 110 may refer to the party that operates the message management platform 110. The communication managing tasks may include providing a frontend software platform (e.g., providing a response interface for interacting with subscribers and viewing the interaction history in the form of a SaaS platform), providing a service (e.g., utilizing the response interface for interacting with subscribers on behalf of application operators), transmitting communication elements to various user computing devices 140 on behalf of the different application operators 120, determining conditions and target audience to transmit those communications, transmitting a series of messages corresponding to message flows, receiving responses from user computing devices 140, forwarding the responses to the application operators 120, and/or taking actions on behalf of the application operators 120.

US Patent Application Publication No. 2022/0198431, entitled "Text Messaging Service Based Commerce System," published on Jun. 23, 2022, is incorporated herein by reference for all purposes.

The messages managed, distributed, transmitted, received, and presented as part of the response interface or the messaging interface by the message management platform 110 may include different types of messages such as text messaging services (e.g., SMS, multimedia messaging service (MMS)), emails (e.g., mobile emails, plain text emails, browser emails), push notification protocols (e.g., APPLE push notification, ANDROID push notification), instant messaging applications (WHATSAPP, WECHAT, TELEGRAM), in-application messages (e.g., messages sent within a mobile application), social networking systems (e.g., FACEBOOK, TWITTER), RSS feeds, web browser notifications, other suitable protocols such as simply message payloads sent as an Internet packet or a series of packets. In some embodiments, the message management platform 110 may focus on a single type of message such as a text messaging service (SMS and MMS).

By way of example, the message management platform 110 may provide a platform for an application operator 120 to design and configure an automated SMS message flow. According to the message flow, the message management platform 110 may send one or more SMS messages on behalf of the application operator 120 to a user computing device 140 based on various triggers that may be related to subscriber action, agent action, time, event, transaction, sequence, and/or response. The message management platform 110 may receive SMS messages from the user computing device 140 and may forward SMS messages to the application operator 120. In some embodiments, the message management platform 110 may provide a platform that connects the application operator 120 and the user computing device 140 to allow the two parties to communicate via SMS in real time. For example, the message management platform 110 may orchestrate a response interface (see FIGS. 5A-5B) for agents (e.g., agents of the application operator 120, or agents of the message management platform 110 acting on behalf of the application operator 120) to interact with the users of the user computing devices 140 to, e.g., assist in selling products offered by the application operator 120. While SMS messaging may be used as the primary example throughout this disclosure, various features described may be expanded to other types of messaging communications.

The message management platform 110 may be operated by an entity that uses a combination of hardware and software to build and operate the platform. A computing server used by the message management platform 110 may include some or all example components of a computing machine described in FIG. 7. The message management platform 110 may sometimes be referred to as a messaging platform or simply a computing server. The message management platform 110 may include a computing server that takes different forms. In some embodiments, the message management platform 110 may be a server computer that executes code instructions to perform various processes described herein. In some embodiments, the message management platform 110 may be a pool of computing devices that may be located at the same geographical location (e.g., a server room) or be distributed geographically (e.g., clouding computing, distributed computing, or in a virtual server network). In some embodiments, the message management platform 110 may be a collection of servers that cooperatively provide messaging services as described. The message management platform 110 may also include one or more virtualization instances such as a container, a virtual machine, a virtual private server, a virtual kernel, or another suitable virtualization instance. The message management platform 110 may provide application operators 120 with various message management services and merchant services as a form of cloud-based software, such as SaaS, through the network 160. Examples of components and functionalities of the message management platform 110 are discussed in further detail below with reference to FIG. 3.

Application operators 120 are entities that control software applications 142 that are used by user computing devices 140. For example, an application operator 120 can be an application publisher that publishes mobile applications available through application stores (e.g., APPLE APP STORE, ANDROID STORE). In some cases, the application may take the form of a website and the application operator 120 is the website publisher/owner. In some embodiments, the application operators 120 are businesses that provide goods and/or services to end users who possess the user computing devices 140. In some embodiments, an application operator 120 sells products through an application 142 and may be referred to as a merchant. In the system environment 100, the application operators 120 may be the customers of the message management platform 110 and the customers of the application builder platform 130.

An application operator 120 may interact directly with its customers or end users in certain aspects, and may delegate certain operations, such as sending and receiving messages, to the message management platform 110. An application operator 120 may maintain accounts of its users and manage day-to-day interactions with the users while directing the message management platform 110 to distribute messages to the users or receive messages from the users on behalf of the application operator 120. For example, the application operator 120 may use a platform provided by the message management platform 110 to design message flows (e.g., automations, campaigns, convert flows, etc.) and route the message flows to subscribers. As another example, the application operator 120 may use the response interface provided by the message management platform 110 (or authorize agents of the message management platform 110) to view and manage the interaction history with the users and other contextual information. That is, the application operator 120, through the message management platform 110, may interact with a user of a user computing device 140 via the response interface that includes the messaging interface for transmitting and receiving messages and for viewing action items associated with the user and/or the agent, and that further includes contextual information associated with the user such as purchase history, order history, browsing history, and the like.

By way of example, an application operator 120 may be a retail business that operates an electronic retail platform in an application 142 and uses the service of the message management platform 110 to communicate order and shipment information to various user computing devices 140. In another example, the application operator 120 may utilize a response platform (e.g., instant chat platform) provided or hosted by the message management platform 110 to interact with its subscribers or customers to resolve issues, or to perform other actions like achieve conversions, send offers or promotions, and the like. In another example, the application operator 120 may utilize a service offered by the message management platform 110 where agents of the message management platform 110 utilize the response platform (e.g., instant chat platform) of the message management platform 110 to interact with subscribers of the application operator 120 on behalf of the application operator 120. In yet another example, another retail business may use the message management platform 110 to transmit marketing and promotional communications (e.g., advertisements, gift cards, coupons, store credits, and receipts) in various forms of messages to user computing devices 140. In yet another example, an application operator 120 may be a retail company that hires the message management platform 110 to send SMS offers to its customers and the customers may make a purchase by directly responding to the SMS message. These are non-exhaustive examples of application operators 120. Various application operators 120 may be independent and unrelated entities, such as different unrelated businesses.

In some embodiments, a message may be considered to be transmitted from the application operator 120 regardless of whether the message publisher's server directly sends the message or the message management platform 110 sends the message.

An application builder platform 130 may include one or more computing servers that perform various tasks related to assisting application operators 120 to build applications 142, providing ready-to-use functionalities to those applications 142, operating a digital distribution platform that provides a selection of third-party functionalities that can be integrated into applications 142, providing back-end functionalities for applications 142, and/or performing actions such as fulfillment for transactions that are completed through applications 142. The application builder platform 130 may refer to the party that operates the application builder platform 130. By way of example, the application builder platform 130 may be an e-commerce platform, such as SHOPIFY, that allows application operators 120 to build an application 142, which may take the form of a mobile application, a website, or a software program, on the platform of the application builder platform 130. The application builder platform 130 may also be referred to as an e-commerce platform, a backend shopping cart platform, or a website builder platform. The application 142 built using the platform may automatically incorporate certain standard features provided by the application builder platform 130, such as the checkout feature, shopping cart, payment management, and inventory management features provided by the application builder platform 130. Hence, the application operator 120 may design, for example, a website using the platform and the website will automatically have e-commerce features. The application builder platform 130 may further provide a digital distribution platform on which various third-party features are distributed. In some embodiments, the message management platform 110 may upload a code snippet (e.g., in the form of an applet, a software development kit (SDK)) to the digital distribution platform. An application operator 120 adding the applet to the application 142 via the digital distribution platform makes the application 142 have additional features that are provided by the applet in communication with the message management platform 110.

With respect to the relationship between the application operator 120 and the application builder platform 130, while the application operator 120 is the operator of an application 142, the application operator 120 may not need to run the application in terms of the application's day-to-day software and hardware operations. The application operator 120 may control the application 142 in the business sense, such as being the owner of the application 142. For example, a retail merchant application operator 120 may own its retail website or retail mobile application. However, an application operator 120 may delegate the application's day-to-day software and hardware operations to the application builder platform 130. As such, in some embodiments, an application operator 120 may also be referred to as an application owner, an application publisher, a business, a service provider, and/or a merchant. In some embodiments, the application operator 120 may run some part of the day-to-day software and hardware operations of its application 142 while the application builder platform 130 provides support and additional features (e.g., e-commerce capability, backend, and platform) to the application 142.

The application builder platform 130 may be operated by an entity that uses a combination of hardware and software to build and operate the platform. The application builder platform 130 may include some or all example components of a computing machine described in FIG. 7. The application builder platform 130 may sometimes be referred to as a website builder server, an e-commerce platform, an online-store building platform, or simply a computing server. The application builder platform 130 may include a computing server that takes different forms. In some embodiments, the application builder platform 130 may be a server computer that executes code instructions to perform various processes described herein. In some embodiments, the application builder platform 130 may be a pool of computing devices that may be located at the same geographical location (e.g., a server room) or be distributed geographically (e.g., clouding computing, distributed computing, or in a virtual server network). In some embodiments, the application builder platform 130 may be a collection of servers. The application builder platform 130 may also include one or more virtualization instances such as a container, a virtual machine, a virtual private server, a virtual kernel, or another suitable virtualization instance. Examples of components and functionalities of the application builder platform 130 are discussed in further detail below with reference to FIG. 2A.

A user computing device 140 is a computing device that is possessed by an end user who may be a customer or a subscriber of an application operator 120. An end user may perform transactions, such as purchases of products and/or services, service arrangement, and communications, with the application operator 120 through the application 142 that is operated by the application operator 120 with some features that may be provided or supported by the application builder platform 130. An end user may also receive messages from the message management platform 110 that are related to an application operator 120. For example, the end user may subscribe to messages of an application operator 120 and the message management platform 110 send those messages (e.g., via the response interface) to the end user on behalf of the application operator 120.

Examples of user computing devices 140 include personal computers (PC), desktop computers, laptop computers, tablets (e.g., iPADs), smartphones, wearable electronic devices such as smartwatches, smart home appliances (e.g., smart home hubs and controllers), vehicle computer systems, or any other suitable electronic devices. In some embodiments, for a message management platform 110 that specializes in SMS messages, user computing devices 140 may be any mobile devices (e.g., phones, tablets) that are equipped with Subscriber Identity Module (SIM) cards, electronic or physical, and/or are associated with phone numbers.

Some of the user computing devices 140 may run one or more applications 142 that are developed by various application operators 120 using the application builder platform 130. For example, the user may download various mobile apps and visit different websites that are operated by various businesses. Each instance of the mobile app and the website may be an example of an application 142. Each application 142 may be developed by different creators. For example, in some embodiments, a first application 142 is developed by a first application operator 120 and a second application 142 is developed by a second application operator 120.

Various applications 142 may take different forms. For example, some applications may take the form of webpages that have backend functionalities built using JAVASCRIPT, RUBY ON RAIL, etc. Other applications may be web applications that may appear as SaaS platforms. Yet other applications may be mobile apps that may run on Swift for iOS and other APPLE operating systems or on Java or another suitable language for ANDROID systems. In another case, an application 142 may be a software program that operates on a desktop computer that runs on an operating system such as LINUX, MICROSOFT WINDOWS, MAC OS, or CHROME OS.

An application 142 may incorporate a code snippet 144 that is provided by the message management platform 110 to enable the application 142 to include functionalities provided by the message management platform 110. In some embodiments, the incorporation may be performed through the digital distribution platform provided by the application builder platform 130. An application operator 120 may select the code snippet 144 of the message management platform 110 from a list of applets at the marketplace of the digital distribution platform and the application builder platform 130 in turn provides or causes a server of the message management platform 110 to provide the code snippet 144 as part of the code of the application 142. In some embodiments, the code snippet 144 may also be incorporated at the code level. This may be done by importing one or more libraries of functions and codes of the code snippet 144 to the software code of the application 142 in the header section of the software code and having the code calling one or more functions of the code snippet 144.

While the application operator 120 primarily operates the application 142, the code snippet 144 allows the application 142 to communicate with the message management platform 110. For example, an application operator 120 may be a retail business that develops an application 142 for its customers to purchase items through the application 142. A customer may opt-in to allow the application 142 to track certain analytics, uncommitted transactions (e.g., actions, browsing history, uncommitted instances, interim browsing history, cookie-tracked instances), and/communications occurred associated with the application 142. The information may be captured by the code snippet 144 and forwarded to the message management platform 110. In another example, the code snippet 144 may be in communication with the message management platform 110 to generate user-tailored information (e.g., personal information, custom promotional messages) to display the information in the application 142, such as in the form of a pop-up, side panel, embedded content, or another suitable way of presentation. In various embodiments, the code snippet 144 may perform any suitable tasks, from front end features, such as providing a control element that is operated by the message management platform 110 on the frontend, to any backend functionalities.

Multiple instances of the code snippet 144 developed by the message management platform 110 may be included in different applications 142. For example, different application operators 120 may be customers of the message management platform 110 and include the code snippet 144 in the applications 142, as illustrated in the user computing device A 140A. Those applications 142 that incorporate the same type of code snippet 144 have included similar functionalities and services provided by the message management platform 110.

Some of the user computing devices 140 may store a cookie 146 that is issued by the message management platform 110. The cookie 146 is used to serve as an identifier so that the message management platform 110 may track a particular user computing device 140 and associate the instance(s) of code snippet 144 that are used in the user computing device 140 with a particular end user or a particular phone number.

The transaction fulfillment operator 150 may be an entity that completes a transaction between an end user and an application operator 120. For example, an end user may make a purchase through the application 142 which is supported by the e-commerce backend provided by the application builder platform 130. After the confirmation of the purchase, the application builder platform 130 (or the application operator 120) may transmit the detail to the transaction fulfillment operator 150 to carry out the transaction, which may include packaging and shipment. The transaction fulfillment operator 150 may provide notifications to the application builder platform 130 regarding various stages of status updates of the purchase, such as the shipment of the parcel, the delivery of the parcel, etc.

The instant chat platform 155 may take the form of a front-end software application platform for application operators 120 to interact with subscribers (e.g., exchange messages (e.g., SMS messages) with subscribers) in real-time and view related contextual information (e.g., purchase history, browsing history, and the like). In some embodiments, the instant chat platform 155 may be a SaaS platform accessible to an agent of the application operator 120 or an agent of another entity that is authorized to act on behalf of the application operator 120 (e.g., an agent of the message management platform). Some or all of the functionality of the instant chat platform 155 may be subsumed by the message management platform 110 (e.g., by response platform 340 in FIG. 3).

Agent device 157 is a computing device that is possessed by an agent of the application operator 120 or an agent of the message management platform 110 to interact with the subscriber of the application operator 120 (e.g., end user of user computing device 140) via the instant chat platform 155. Although FIG. 1 illustrates one agent device 157, the system environment 100 may include more than one instances of the agent device 157 respectively utilized by agents of the application operator 120 or agents of the message management platform 110 (acting on behalf of the application operator 120) interacting with the subscribers. Examples of agent devices 157 include personal computers (PC), desktop computers, laptop computers, tablets (e.g., iPADs), smartphones, wearable electronic devices such as smartwatches, smart home appliances (e.g., smart home hubs and controllers), vehicle computer systems, or any other suitable electronic devices. In some embodiments, for a message management platform 110 that specializes in SMS messages, the agent devices 157 may be any mobile devices (e.g., phones, tablets) that are equipped with Subscriber Identity Module (SIM) cards, electronic or physical, and/or are associated with phone numbers.

The networks 160 provide connections to the components of the system environment 100 through one or more sub-networks, which may include any combination of the local area and/or wide area networks, using both wired and/or wireless communication systems. In some embodiments, the networks 160 use standard communications technologies and/or protocols. For example, a network 160 may include communication links using technologies such as Ethernet, 802.11, worldwide interoperability for microwave access (WiMAX), 3G, 4G, Long Term Evolution (LTE), 5G, code division multiple access (CDMA), digital subscriber line (DSL), etc. Examples of network protocols used for communicating via the network 160 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over a network 160 may be represented using any suitable format, such as hypertext markup language (HTML), extensible markup language (XML), JavaScript object notation (JSON), structured query language (SQL). In some embodiments, all or some of the communication links of a network 160 may be encrypted using any suitable technique or techniques such as secure sockets layer (SSL), transport layer security (TLS), virtual private networks (VPNs), Internet Protocol security (IPsec), etc. The networks 160 also include links and packet switching networks such as the Internet.

Example Application Builder Platform Components

Figure 2A:
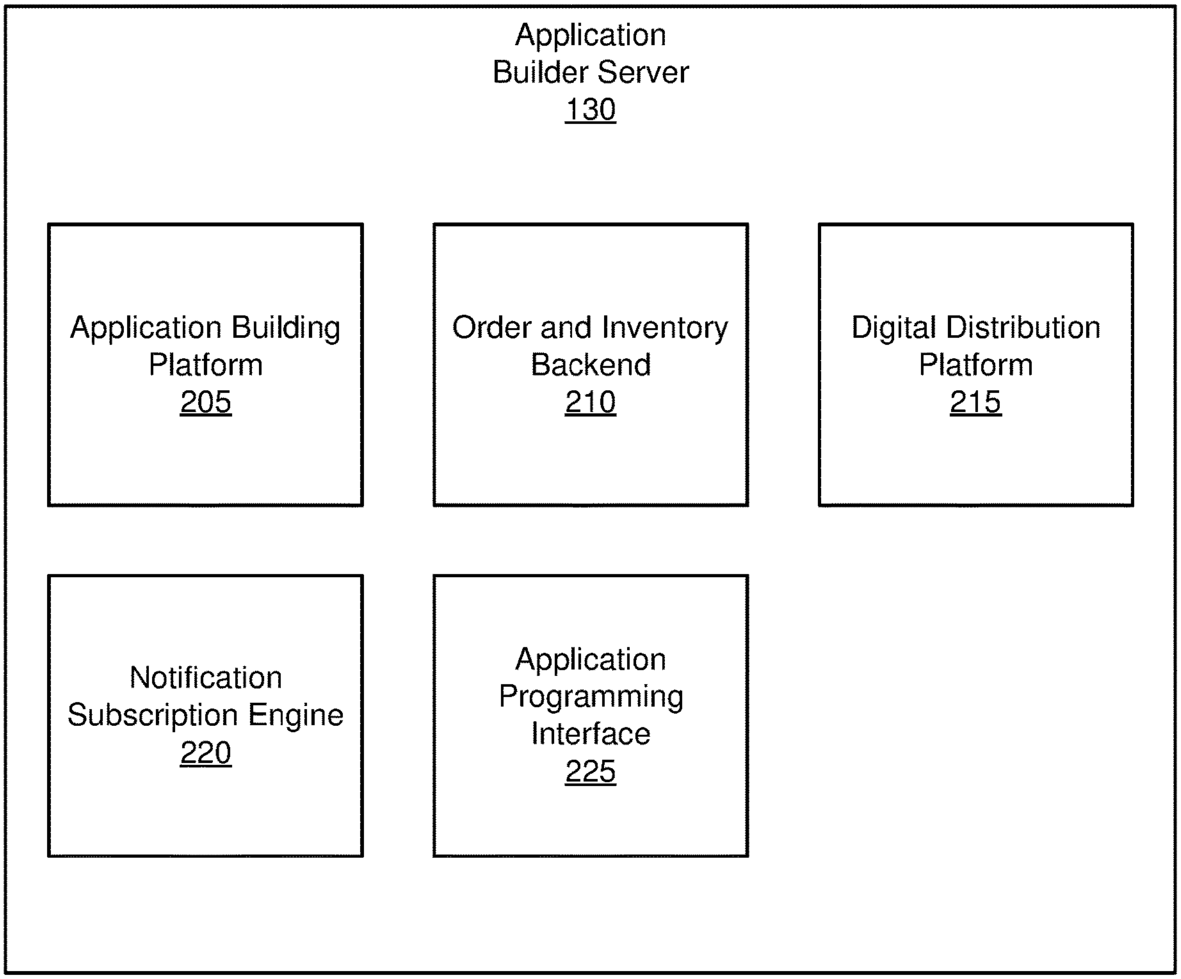
FIG. 2A is a block diagram illustrating various components of an example application builder platform, in accordance with some embodiments.

FIG. 2A is a block diagram illustrating various components of an example application builder platform 130, in accordance with some embodiments. An application builder platform 130 may include an application building platform 205, an order and inventory backend 210, a digital distribution platform 215, a notification subscription engine 220, and an application programming interface 225. In various embodiments, the application builder platform 130 may include fewer or additional components. The application builder platform 130 also may include different components. The functions of various components in application builder platform 130 may be distributed in a different manner than described below. Moreover, while each of the components in FIG. 2A may be described in a singular form, the components may present in plurality.

The application building platform 205 may take the form of a front-end software platform that allows an application operator 120 to design and configure various visual elements and functionalities of an application 142. The building of an application 142 may be based on standard language such as HTML, CSS, JAVASCRIPT, etc. The application builder platform 130 may provide certain pre-built features that allow the application operator 120 to incorporate into the application 142. The pre-built features may include an e-commerce platform, shopping cart features and related order and inventory backend 210, a search engine for the application, payment management, and analytics. As discussed in further detail below, additional features and functionalities may be selected at the digital distribution platform 215 for applets that are provided by other parties.

The order and inventory backend 210 may be a management system that allows the application operator 120 to act as a merchant to sell various goods at the application 142 and manage the inventory of those goods. For each product for a particular merchant, the application builder platform 130 may assign a unique product identifier. In some products that have sub-variants, such as apparel that have sizes and colors, the application builder platform 130 may assign a variant identifier. The order and inventory backend 210 may also allow the application operator 120 to define a taxonomy of products that have categories, levels of sub-categories, and products. The application builder platform 130 may also assign an identifier for each category or sub-category. The application builder platform 130 may include the identifier for a page in the application 142 that is related to the product, variant, category, or subcategory. For example, on the product page of the merchant application 142 that display product detail to the customers, the URL of the page or the HTML of the page may include the product identifier.

The digital distribution platform 215 may take the form of a marketplace, which may be open or semi-open, to various third-party developers to list their software applications that can be incorporated into an application 142 of an application operator 120. An application operator 120 may browse and select various applications on the digital distribution platform 215. For the applications that are selected by the application operator 120, the code of the selected applications is incorporated into the application 142 to expand the functionalities and features of the application 142. For example, the message management platform 110 may publish the code snippet 144 in the digital distribution platform 215 and an application operator 120 may incorporate the code snippet 144 into an application 142.

The notification subscription engine 220 allows an application operator 120 to subscribe to different notification channels that are provided by the application builder platform 130. The notification channels may be divided based on event types, merchants, and other suitable factors. For example, the application builder platform 130 may manage the e-commerce and sales of products on behalf of an application operator 120. The notification channels may include channels that provide data on committed transactions (e.g., committed instances, completed web browsing sessions, API-tracked instances, etc.) such as purchase notifications, shipment notifications, delivery notifications, etc. An application operator 120 may select one or more channels to subscribe. In some embodiments, an application operator 120 may authorize the message management platform 110 to subscribe to one or more notification channels on behalf of the application operator 120. The subscription process may include providing a credential of the application operator 120 to the application builder platform 130 through an API call. The API call includes a parameter ("purchase" for purchase events, "shipment" for shipment events) that specifies the notification channel to subscribe. After subscription, the application builder platform 130 provides notifications of a particular type of event to the recipient (the application operator 120 or the message management platform 110).

The application programming interface 225 allows the application builder platform 130 to provide notifications for recipients on subscribed channels. In some embodiments, the notifications can be provided in the form of pull notifications by conventional API in which the recipient (the application operator 120 or the message management platform 110) may continuously poll the API. In some embodiments, the notifications can be provided through webhook, which may be a form of push API notifications where the application builder platform 130 automatically transmit the API notifications to the recipient when a matching event has occurred. An API notification, such as a webhook notification, may include a header and a payload. The payload may be in the format of key-value pairs that are in the format of JSON, XML, YAML, CSV, or another suitable format.

Figure 2B:
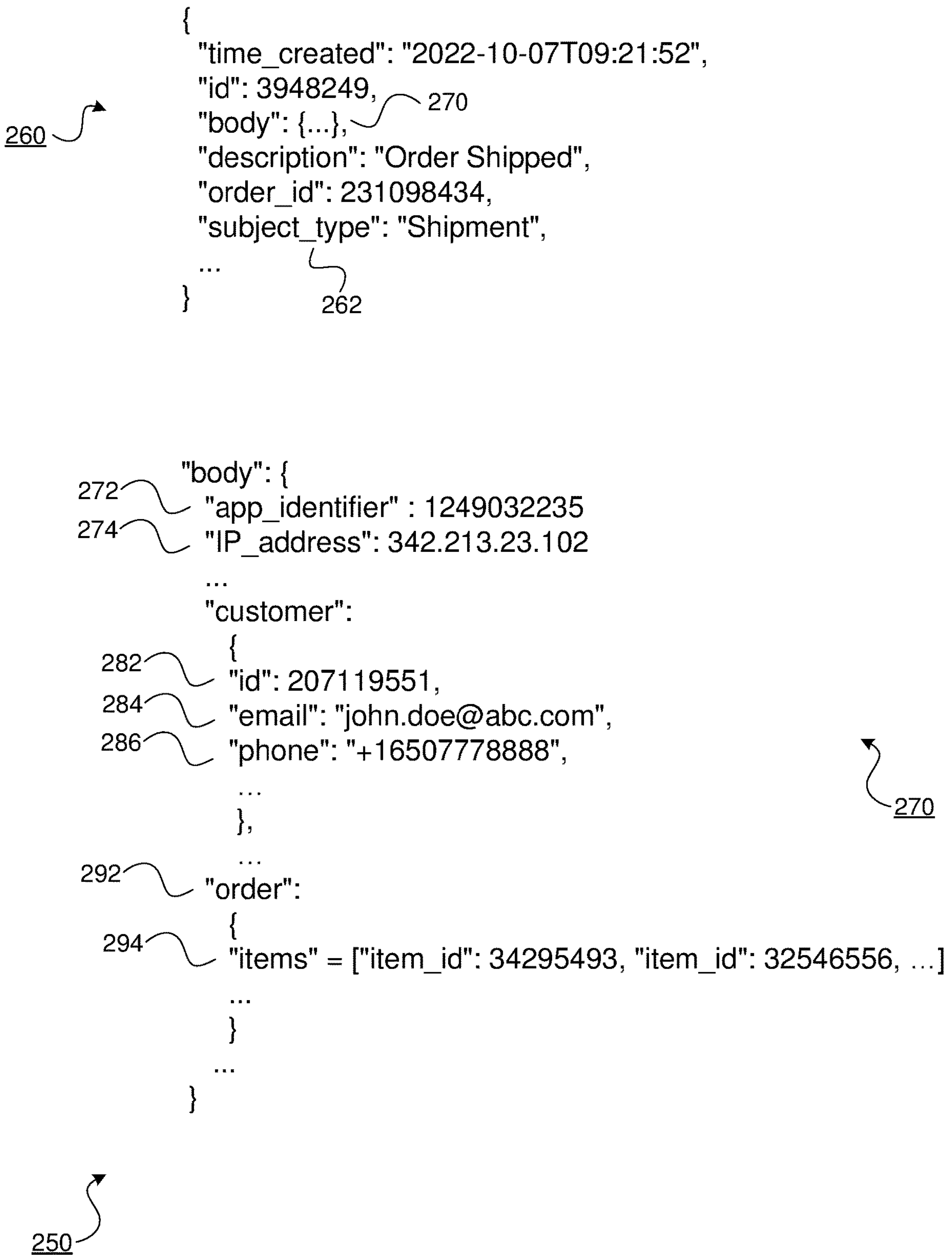
FIG. 2B is a conceptual diagram illustrating an example payload of an API notification, such as a webhook notification, provided by the application builder platform, in accordance with some embodiments.

FIG. 2B is a conceptual diagram illustrating an example payload 250 of an API notification, such as a webhook notification, provided by the application builder platform 130, in accordance with some embodiments. The payload 250 may take the form of key-value pairs. The keys and values shown in the payload 250 are for example only. In various embodiments, the payload 250 may include fewer, additional, or different keys. In some embodiments, the pairs may be nested.

The top portion of the example payload 250 may be the first level of key-value pairs and may be referred to as the wrapper 260. The wrapper 260 includes the body 270 of the payload 250 and other high-level information of the payload 250, such as the identifier of the API notification, the identifier of the order related to this notification, the subscription channel 262 of the notification (e.g., "subject_type": "Shipment") and other information. The body 270 may be another nested key-value pairs that include additional information contained in the API notification. An example body 270 is separately shown in the lower portion of FIG. 2B.

The body 270 may take the form of another layer of nested key-value pairs that include various information regarding the order, the end user, and other related identification information. In some embodiments, the body 270 may include a key for the identifier 272 of an application 142 and an IP address 274 of the user computing device 140 engaging in the transaction. The application builder platform 130 may also have the information of the end user (e.g., customer record data), which is recorded in the key "customer." The customer record data may include a unique user identifier (e.g., customer identifier) 282, the email address 284 of the end user, and the phone number 286 of the end user. The body may further include a key for the order 292 and the value corresponding to the order 292 may include detailed information about the order 292. In some embodiments, the API notification may include an array that lists all of the items 294 in the order 292. The items 294 may be in the format of an array that includes the product or variant identifier of those items in the order 292.

Example Message Management Platform Components

Figure 3:
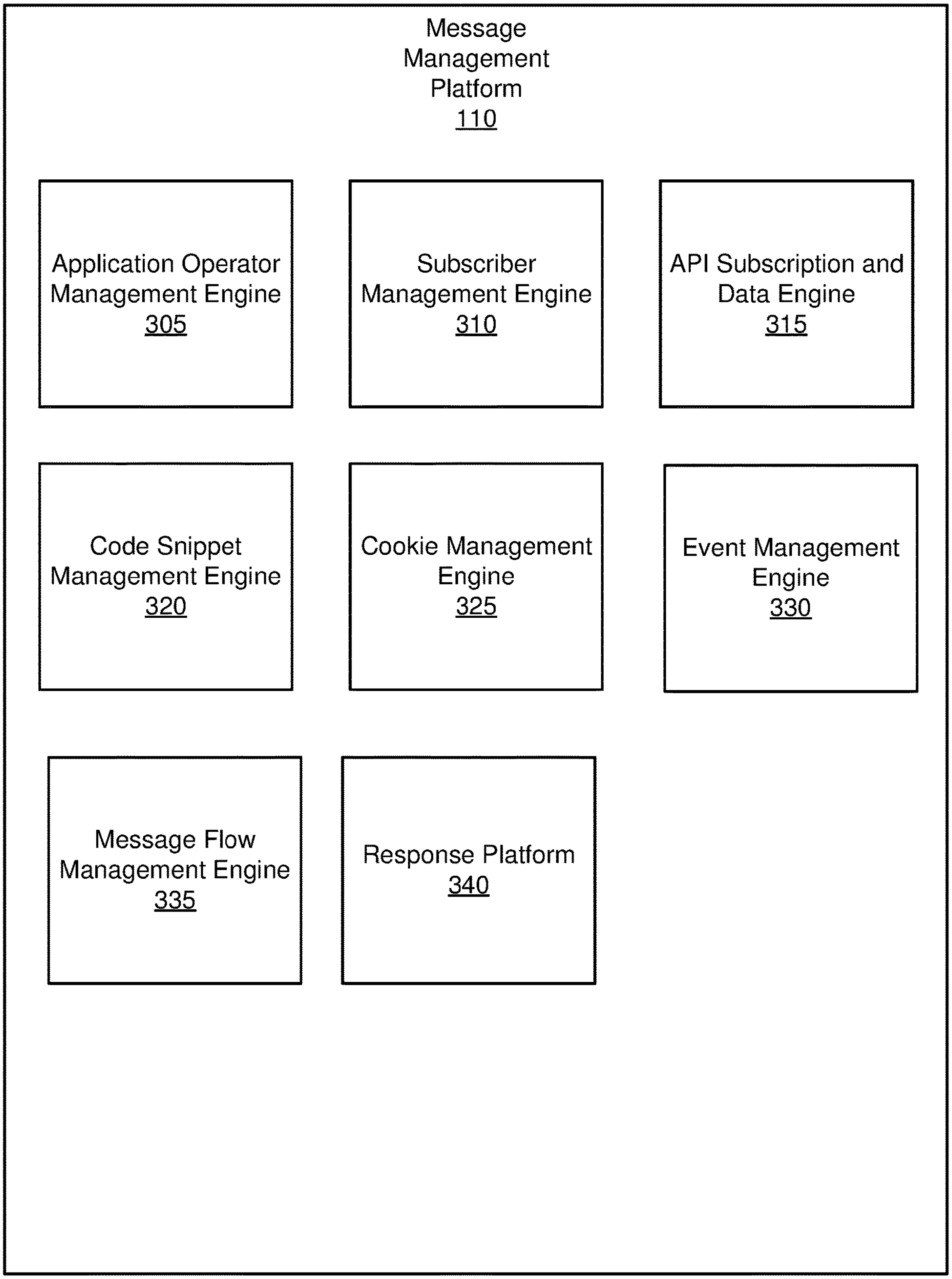
FIG. 3 is a block diagram illustrating various components of an example message management platform, in accordance with some embodiments.

FIG. 3 is a block diagram illustrating various components of an example message management platform 110, in accordance with some embodiments. A message management platform 110 may include an application operator management engine 305, a subscriber management engine 310, an API subscription and data engine 315, a code snippet management engine 320, a cookie management engine 325, an event management engine 330, a message flow management engine 335, and a response platform 340. In various embodiments, the message management platform 110 may include fewer or additional components. The message management platform 110 also may include different components. The functions of various components in message management platform 110 may be distributed in a different manner than described below. Moreover, while each of the components in FIG. 3 may be described in a singular form, the components may present in plurality.

The components of the message management platform 110 may be embodied as software engines that include code (e.g., program code comprised of instructions, machine code, etc.) that is stored on an electronic medium (e.g., memory and/or disk) and executable by a processing system (e.g., one or more processors and/or controllers). The components also could be embodied in hardware, e.g., field-programmable gate arrays (FPGAs) and/or application-specific integrated circuits (ASICs), that may include circuits alone or circuits in combination with firmware and/or software. Each component in FIG. 3 may be a combination of software code instructions and hardware such as one or more processors that execute the code instructions to perform various processes. Each component in FIG. 3 may include all or part of the example structure and configuration of the computing machine described in FIG. 7.

The application operator management engine 305 manages the profiles and credentials of application operators 120 who wish to use the features and services of the message management platform 110. For example, an application operator 120 that intends to use the response interface (or to utilize services provided by message management platform 110 based on the response interface) hosted by the message management platform 110 to interact with subscribers, view related contextual information (e.g., committed transactions, uncommitted transactions), route the subscribers to customized message flows, etc., may create an account with the message management platform 110. The message management platform 110 stores the customer's (i.e., application operator merchant) profile, metadata, and credentials and associate the information with a unique identifier. Using the functionality provided by the message management platform 110, the application operator 120 may select or specify types of events (e.g., committed transaction events, uncommitted transaction events) and analytics to be captured by the message management platform 110, manage subscription plans, configure message flows, setup phone numbers or short codes for exchanging messages with subscribers via the response interface, and configure other settings. Short codes (e.g., short numbers) may be short digit sequences, that are shorter than telephone numbers, that may be used to address messages in SMS or MMS systems of mobile network operators or to address abbreviated dialing. The settings are associated with the merchant identifier and can be retrieved, duplicated, edited, and deleted based on the application operator's preferences. In some embodiments, the application operator management engine 305 may also store credentials or access keys of application operators 120. The application operator 120 may provide the message management platform 110 an access key, such as an API access key with a particular level of access privilege, for the message management platform 110 to subscribe to various notification channels (e.g., one or more channels related to committed transactions) provided by the application builder platform 130.

The subscriber management engine 310 manages profiles of subscribers that exchange messages with the message management platform 110. Each subscriber whose profile is managed by the subscriber management engine 310 may be assigned a subscriber identifier by the subscriber management engine 310. Each subscriber profile may also include data corresponding to the subscriber like the entire record of messages exchanged with a user computing device 140 corresponding to the subscriber (e.g., chat or message history data, interaction history data), including metadata of the messages (e.g., date and time of the messages); user action data of actions taken by the subscriber like committed transactions such as purchases (e.g., purchase history data, order history data), and uncommitted transactions such as browsing history (e.g., browsing history data); agent action data of actions taken by the agent acting on behalf of the application operator 120 like routing or assigning the subscriber to a message flow, adding or removing tags to the subscriber's profile; and the like.

The subscriber management engine 310 may create, maintain, edit, or update the subscriber profiles and the corresponding data by associating subscribers or end users based on phone numbers and/or the user computing devices 140. For example, based on the phone number of a subscriber from which a message is received by the message management platform 110, the subscriber management engine 310 may associate the subscriber identifier with the user identifier 282 used by the application builder platform 130 by matching the phone number associated with the subscriber identifier with a phone number that may be included in an API notification payload received from the application builder platform 130. As another example, depending on whether a user computing device 140 is determined as possessing an application 142, a code snippet 144, and/or a cookie 146, the subscriber management engine 310 may also associate the subscriber identifier with one or more of the following: phone number, email address, device identifier, application identifier, and/or cookie identifier.

The API subscription and data engine 315 subscribes to various API notification channels (e.g., webhook channels, committed transaction channels) provided by the application builder platform 130 on behalf of application operators 120. For example, an application operator 120 authorizes the message management platform 110 to receive (committed transaction event) data from the application builder platform 130 for one or more API channels for relevant information related to the e-commerce service of the application operator 120. In some embodiments, the API subscription and data engine 315 receives payloads 250 from the application builder platform 130 webhook.

The API subscription and data engine 315 in turn may identify the application operator 120 who is the intended recipient of the payload 250. For example, based on information included in the payload 250 (e.g., application identifier), the API subscription and data engine 315 may determine the application operator 120 that is the intended recipient of the payload 250. Further, discussing FIG. 3 in conjunction with FIG. 2B, the API subscription and data engine 315 may identify the nature of each payload 250 by reviewing the notification channel type 262, and further identify the user computing device 140 associated with the payload 250 based on, e.g., application identifier 272 and device IP address 274, and/or identify a subscriber identifier corresponding to the payload 250 based on, e.g., the customer identifier 282, email 284, and/or phone number 286 associated with the payload 250.

In some embodiments, the API subscription and data engine 315 may also maintain a mapping of subscriber identifiers stored by message recipient management engine 310 and the user or customer identifiers 282 that are used by the application builder platform 130 and that may be received as part of each payload 250. Thus, for example, if the customer or user identifier 282 received in a payload 250 is already mapped to a subscriber identifier of the subscriber management engine 310, the API subscription and data engine 315 may be able to immediately determine the user (subscriber) who is specified in payload 250 and update the corresponding subscriber profile maintained by the subscriber management engine 310 to include data corresponding to the payload (e.g., purchase history data, order history data).

In some cases, if the mapping for a particular user customer identifier 282 in a received payload is not available in the system of the message management platform 110, the API subscription and data engine 315 may inspect other key values in the payload 250 like the email 284 and the phone number 286 to determine the subscriber who is specified in the payload 250. If, even after inspecting the other key values in the payload 250, the API subscription and data engine 315 is not able to determine who the subscriber of the payload is, the API subscription and data engine 315 may control the subscriber management engine 310 to create a new subscriber profile and assign a subscriber identifier to the newly created subscriber profile, add the mapping to the mapping maintained by the API subscription and data engine 315, and update the newly created subscriber profile to include data corresponding to the payload (e.g., purchase history data, order history data). Further, when updating the subscriber profile with the payload data, the API subscription and data engine 315 may review various key value pairs in the payload 250 and in turn associate the data to corresponding fields in the subscriber profile.

The code snippet management engine 320 manages the code snippets 144 and receives data from the code snippets 144. In some embodiments, a version of the code snippet 144 may be a background applet that tracks users' actions in the e-commerce system provided in the application 142. For example, each product or category page of the e-commerce system may be associated with a product, variant, and/or category identifier assigned by application builder platform 130 as discussed in the order and inventory backend 210 in FIG. 2A. Those identifiers may be generally referred to as item identifiers. For an item page in the application 142, the item identifier corresponding to the item may be included in the HTML code or the URL of the item page. The code snippet 144 may parse the item identifier as the end user visits a page and transmit the item identifier to the code snippet management engine 320. As such, the code snippet 144 may be used to track various user actions (e.g., uncommitted transactions, uncommitted instances, cookie-tracked instances, interim browsing history, etc.) including viewing a product page, adding an item to a shopping cart, beginning to check out, completing a transaction, etc.

Based on preapproval by the end user, the code snippet 144 may transmit the information of the user action to the code snippet management engine 320 as a notification including a payload corresponding to an uncommitted transaction event. The payload of the uncommitted transaction event may be similar to the payload 250 for the webhook notification described above in that the payload may include key-value pairs related to the uncommitted transaction event and further include high-level information or wrapper data. Additionally, or alternatively, in some embodiments, the code snippet 144 may maintain one or more active user interface elements intended for display in the application 142, such as in the form of a popup. The code snippet 144 may receive a message from the message management platform 110 including configuration data for the message. The code snippet 144 may cause the application 142 to display the message. This may be used for in-app promotional content and personal content for the application 142.

The cookie management engine 325 installs and manages various cookies 146 in user computing devices 140. A cookie 146 may be installed on a user computing device 140 through an approval process. The approval process may vary depending on embodiments and situations. For example, the approval may take the form of an end user affirmatively selecting subscription of contents from the application operator 120, via clicking a message or responding to a text message such as an SMS message. In another case, the approval may take the form of an end user authorizing the use of cookies. In some embodiments, when a user opens an application 142 that has the code snippet 144 installed, the code snippet 144 communicates to the message management platform 110 to see if there is a cookie already installed at the user computing device 140. If not, the code snippet management engine 320 may generate a random string that can be incorporated as part of the cookie 146 and send the random string to the user computing device 140. In turn, the user approves the cookie 146 and the cookie is generated and stored in the user computing device 140. The random string may be used as an identifier or a part of the identifier for a user computing device 140. In communicating with the message management platform 110, code snippet 144 may refer to one or more identifiers of the cookie 146 as an identification source for a particular user computing device 140.

When the uncommitted transaction event's notification is received from a user computing device 140 by the code snippet management engine 320, based on information included in the payload (e.g., cookie identifier, IP address, email, phone number, code snippet identifier, application identifier, etc.), the code snippet management engine 320 may determine the application operator 120 that is the intended recipient of the payload, and further identify the subscriber identifier associated with the payload. For example, if one or more of the key values like a phone number, a cookie identifier, a device identifier, or an IP address of a subscriber profile managed by the subscriber management engine 310 matches the corresponding one or more of a phone number, a cookie identifier, a device identifier, or an IP address included in the received payload, the code snippet management engine 320 may be able to determine the subscriber who is specified in the payload and associate the payload to the subscriber and update the corresponding subscriber profile maintained by the subscriber management engine 310 to include the received uncommitted transaction event as browsing history data.

As another example, the code snippet management engine 320 may generate a unique link that may be sent in a message by the message management platform 110 to a particular subscriber. The unique link may be associated with the subscriber's identifier in the subscriber profile. The subscriber may click on the unique link on their user computing device 140 to access the application 142. The code snippet 144 incorporated in the application 142 may track the user action based on the clicked link (and based on a cookie 146 preapproved by a user of the device 140) and transmit the information of the user action to the code snippet management engine 320 as a notification of an uncommitted transaction event. The payload included in the received notification may include an identifier of the cookie and/or an identifier corresponding to the unique link. The code snippet management engine 320 may thus be able to determine the subscriber who is specified in the payload and associate the payload corresponding to the unique link to the subscriber and update the corresponding subscriber profile maintained by the subscriber management engine 310 to include the received uncommitted transaction event as browsing history data.

If the code snippet management engine 320 is not able to determine who is the subscriber of the payload received from the code snippet 144, the code snippet management engine 320 may control the subscriber management engine 310 to create a new subscriber profile, assign a new subscriber identifier to the newly created subscriber profile, and update the newly created subscriber profile to include data corresponding to the payload (e.g., browsing history data). Further, when updating the subscriber profile with the payload data, the code snippet management engine 320 may review various key value pairs in the payload and in turn associate the data to corresponding fields in the subscriber profile.

The event management engine 330 manages and stores events associated with the subscribers. The events may be generated when a message is exchanged with a subscriber by the message management platform 110 (e.g., send a message to the subscriber (message transmit event), receive a message from the subscriber (response event); messaging events) or in response to a user action (e.g., committed transaction events, uncommitted transaction events; user action events) or an agent action (e.g., a tagging event, a message flow routing event, issue resolved event, subscriber opt-out event; agent action events). Data corresponding to the generated events may be stored as part of the subscriber profile managed by the subscriber management engine 310. Metadata corresponding to the generated events (e.g., date and time of the event; particulars of the exchanged message, the user action, or the agent action that generated the event, etc.) may also be stored as part of the subscriber profile.

The user action events may be generated based on received payloads (e.g., API notification payloads, code snippet notification payloads) from the user computing devices 140 and/or from the application builder platform 130. The agent action events may be generated based on agent actions performed by agents via the response interface.

More specifically, the user action events may be generated based on the notifications from the code snippets 144 installed in user computing devices 140, or generated based on the API notifications, such as webhook notifications, of the application builder platform 130. By way of example, the message management platform 110 may receive an API notification from the application builder platform 130 that includes a customer identifier 282 in the payload 250. The API subscription and data engine 315 may match the customer identifier 282 of the application builder platform 130 to the subscriber identifier managed by the subscriber management engine 310 to determine the subscriber profile that is related to the received API notification. The event management engine 330 may analyze the received payload to determine the type of event (e.g., type of committed transaction event such an order created event, order shipped event, order received event, etc.) as that corresponds to the received payload, and stores the data (including metadata such as date and time, order details, order number, shipping details, tracking number, etc.) as part of the context information in the corresponding determined subscriber profile. The events (e.g., the API notification-based events) may be related to actions taken by a transaction fulfillment operator 150 such as completing an order, placing an order for shipment, delivery of an item, etc.

As another example, the message management platform 110 may receive an event notification (e.g., for an uncommitted transaction) from a code snippet 144 of an application 142. For example, the code snippet 144 may track the actions of the end user in browsing or purchasing on an e-commerce application 142. The code snippet 144 may transmit notifications to the message management platform 110 describing the actions taken by the user and the products that are associated with the actions. The code snippet management engine 320 may identify a subscriber profile that is related to the received code snippet-based notification by matching, e.g., a cookie identifier, associated with the received notification with a cookie identifier corresponding to a subscriber profile managed by the subscriber management engine 310. The event management engine 330 may analyze the payload included in the received code snippet based notification to determine the type of event (e.g., type of uncommitted transaction event or browsing history event such an product viewed event, cart abandoned event, product added to cart event, etc.) that corresponds to the received payload, and stores the data (including metadata such as date and time of the event, item identifier of item that was viewed, added to cart, removed from cart, etc.) as part of the context information in the corresponding determined subscriber profile. The uncommitted transaction events described in the received notifications from the code snippet 144 may be of any suitable nature. In some cases, the events may be related to actions taken by an end user in using an application 142. For example, the actions can be visiting a product page, subscribing to certain types of information, beginning to check out, completing a checkout, canceling a transaction, etc. The events (e.g., the cookie-tracked notification events) may further be related to the usage of an application 142 such as opening the application, closing the application, and uninstalling the application.

As explained previously, the events generated by the event management engine 330 and stored in a corresponding subscriber profile may also include agent action events that are generated based on agent actions performed by agents with respect to subscribers, e.g., via the response interface. For example, the agent action may be to add or remove one or more tags associated with a subscriber profile. Tags may serve one or more purposes such as audience segmentation. The tags may take the form of metadata tags. The tags may include information such as preferences of the corresponding subscriber, opt-in or opt-out options of the subscriber (e.g., subscribed or not), and other characteristics of the subscriber, including consented information such as gender, age, interested products, interested news, etc. Based on the tags, the subscriber management engine 310 may categorize the subscribers into one or more groups. Based on the agent action to add or remove a tag (e.g., via the response interface), the event management engine 330 may generate a tag event (e.g., tag add event, tag remove event) associated with the corresponding subscriber, and store data related to the event in the corresponding subscriber profile. Metadata associated with the event (e.g., date and time of event, type or name of tag, tag identifier, etc.) may also be stored by the event management engine 330 as part of the generate tag event.

As another example, the agent action may be to route (e.g., assign, add, subscribe) a particular subscriber profile to one or more message flows. A message flow (e.g., message series) may be a sequence of messages that may be created by the application operator 120 using, e.g., a flow designer. A subscriber may be enrolled into a message flow, and one or more messages (e.g., SMS messages) per the message flow may automatically be sent to the subscriber enrolled into the flow based on predetermined conditions. Additional details regarding managing message flows are described below in connection with the message flow management engine 335. Based on the agent action to add (e.g., route, enroll, assign) or remove the subscriber to a predefined message flow (e.g., via the response interface), the event management engine 330 may generate a message flow event associated with the corresponding subscriber, and store data related to the event in the corresponding subscriber profile. Metadata associated with the event (e.g., date and time of event, type or name of message flow, message flow identifier, etc.) may also be stored by the event management engine 330 as part of the generated message flow event.

As another example, the agent action may be to opt-out a subscriber from receiving messages from the message management platform 110. Based on the agent action to opt-out the subscriber, the event management engine 330 may generate an opt-out event associated with the corresponding subscriber, and store data related to the event in the corresponding subscriber profile. Metadata associated with the event (e.g., date and time of the event etc.) may also be stored by the event management engine 330 as part of the generated opt-out event. As another example, the agent action may be to indicate that the issue a particular subscriber is having has been resolved. Based on the agent action to indicate the issue as being resolved, the event management engine 330 may generate an issue resolved event associated with the corresponding subscriber, and store data related to the event in the corresponding subscriber profile. Metadata associated with the event (e.g., date and time of the event etc.) may also be stored by the event management engine 330 as part of the generated issue resolved event.

The message flow management engine 335 manages the message flows that are designed and saved by the application operator 120. The message flow management engine 335 may cause a server to automatically transmit various messages to different user computing devices 140 (subscribers) based on different conditions. A message flow may be associated with a start condition, an end condition, a message order, message branching, trigger conditions, and channels of communication. A start condition may include various rules that specify when a message series or flow will be triggered for a particular user computing device 140. As described above in connection with the event management engine 330, the start condition may also be manually started by an application operator 120 (e.g., the agent) by enrolling or routing a particular message flow to a particular subscriber via, e.g., the response interface. For example, when the agent is in a chat session with the subscriber, the agent may manually enroll the subscriber into a flow based on the context of the conversation between the agent and the subscriber, based on the goal of the agent in having the conversation (e.g., to sell a product), and based on other contextual information included in the subscribers profile (e.g., purchase history, order history, browsing history, etc.). A trigger condition may be an event, such as a user event that is received via an API notification from the application builder platform 130 indicating the user has performed an action. For example, a message flow may be triggered when a user completed a purchase. The end condition may specify that a message series is completed after all messages in the series are sent. Other end condition examples may specify rules for a message series to end prematurely. For example, a message series may end on a conversion event (e.g., generation of a committed transaction event) or when a response is received (e.g., generation of a response event). The selection of messages in a message flow may further depend on the recipient's response or a lack of response. For example, the message flow may be distributed via SMS which allows the user to respond. The message management platform 110 may determine that the recipient did not provide a response to messages and select a message branch based on this condition. In another example, the user may provide a response via SMS. Based on the type of response and the goal specified by the application operator 120 when designing the message flow, the message management platform 110 may select a different subsequent message to be sent to the recipient 140.

The response platform 340 may take the form of a front-end software application platform for application operators 120 (or their agents) to interact with subscribers (e.g., exchange messages with subscribers) in real-time and view related contextual information (e.g., purchase history, browsing history, etc.). In effect, the response platform 340 may be the front-end layer on top of the subscriber profile data of the subscriber management engine 310. In some embodiments, the response platform 340 may be a SaaS platform accessible to an agent of the application operator 120 (or an agent of another entity that is authorized to act on behalf of the application operator 120). The response platform 340 may subsume some or all of the functionality of the instant chat platform 155 of FIG. 1. Examples features, functionalities, and graphical user interface elements of the response platform 340 are shown in FIG. 4 through FIG. 5B.

Example Response Platform Components

Figure 4:
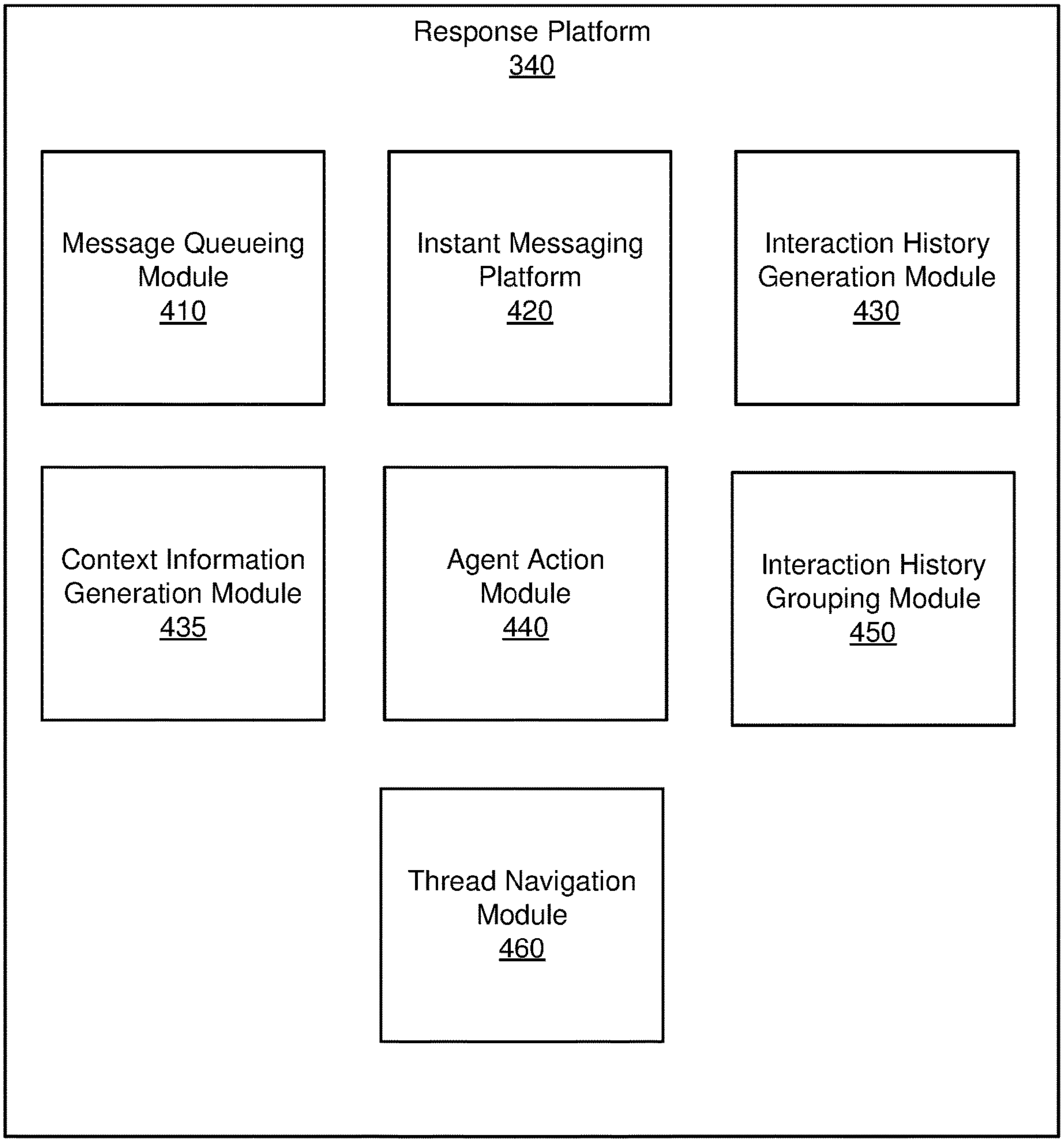
FIG. 4 is a block diagram illustrating various components of an example response platform of the example message management platform of FIG. 3, in accordance with some embodiments.

FIG. 4 is a block diagram illustrating various components of an example response platform 340, in accordance with some embodiments. A response platform 340 may include a message queueing module 410, an instant messaging platform 420, an interaction history generation module 430, a context information generation module 435, an agent action module 440, an interaction history grouping module 450, and a thread navigation module 460. In various embodiments, the response platform 340 may include fewer or additional components. The response platform 340 also may include different components. The functions of various components in the response platform 340 may be distributed in a different manner than described below. Moreover, while each of the components in FIG. 4 may be described in a singular form, the components may present in plurality.

The message queueing module 410 may be configured to manage a queue of messages from different subscribers received by the message management platform 110. For example, a user may subscribe to receiving SMS messages from an application operator 120 by clicking on a pop-up link during a browsing session associated with the application 142 on a user computing device 140 and sending the SMS message that is generated by clicking on the link to the message management platform 110. As another example, an existing subscriber may send an SMS message (e.g., by interacting with the application 142) intended for the application operator 120 to resolve an issue the subscriber is having or to ask a question. The message queueing module 410 may filter messages received by message management platform 110 from different subscribers based on predetermined conditions. For example, the predetermined conditions may be based on a keyword associated with the pop-up link clicked by the user so that user clicks on only predetermined pop-up banners may receive live agent attention. The message queueing module 410 may add the filtered messages to a message queue and provide a front-end interface for live agents associated with the application operator 120 to select and resolve individual subscriber messages in the queue.

The instant messaging platform 420 may be a front-end software platform that allows agents of message management platform 110 or an application operator 120 to communicate in real-time, e.g., via SMS, with the subscribers whose messages are added to the message queue by the message queueing module 410. For example, a user has subscribed to receiving SMS messages from an application operator and a live agent is assigned to the user to communicate with the user. The live agent may select the user's message from the queue, and using the same interface, send a message acknowledging the subscription and further send a message offering a special promotion or discount. The subscribed user may further respond to the message including the offer from the live agent. The instant messaging platform 420 may enable live messaging between subscribers and agents.

The integrated interaction history generation module 430 generates, for presentation in a messaging interface of the response platform 340, the interaction history between a subscriber and the application platform based on events (e.g., messaging events, user action events, agent action events) generated by the event management engine 330, and the corresponding the subscriber profile data stored by the subscriber management engine 310. The integrated interaction history generation module 430 may thus present a plurality of interaction elements in a chronological order in the messaging interface of the response platform 340, the interaction elements corresponding to the entire chat history or messaging history between the subscriber and the application operator and to action items generated based on the user events and/or the agent events generated by the event management engine 330.

Based on the generated user events and agent events, the context information generation module 435 may also generate context information such as routed messages flows, tags added to the subscriber profile, past orders, past products purchased, browsing history, and related metadata, and present the context information in an action interface of the response platform 430.

The agent action module 440 provides front-end functionality in the response interface to an agent to perform one or more agent actions. For example, the agent action may be to add or remove one or more tags. As another example, the agent action may be to route a subscriber to one or more message flows. As another example, the agent action may be to opt-out a subscriber from receiving messages from the message management platform 110. As another example, the agent action may be to indicate that the issue a particular subscriber is having has been resolved. Based on the action performed by the agent, the event management engine 330 generates the corresponding agent events and stores data of the generated events in the subscriber profile, as explained previously.

The interaction history grouping module 450 may be configured to divide interaction elements in the interaction history into one or more groups or threads. Each thread may correspond to a particular anchor. An anchor can be an order placed by a customer, passage of a predetermined period of time since a message was last received from a subscriber, a conversation topic or subject, and the like. The interaction history grouping module 450 may be configured to analyze the interaction history including the plurality of interaction elements and identify one or more anchors in the history. The interaction history grouping module 450 may be configured identify a particular interaction element (e.g., a particular message, a particular action item) in the interaction history as an anchor. For example, a subscriber may place a first order with a merchant and have a conversation with an agent related to the first order when the order was placed. Further, actions taken by the subscriber or the agent during this period may generate action items that are also added to the interaction history. After some time (e.g., a few days or a few weeks) the subscriber may place a second unrelated order with the merchant and have another conversation with an agent related to the second order when the second order is placed. Actions taken by the subscriber or the agent during this period may generate action items that are also added to the interaction history.

In this case, the interaction history grouping module 450 may identify a first interaction element (message or user/agent action item) corresponding to the first order as a first anchor and identify a first interaction element (message or user/agent action item) corresponding to the second order as a second anchor. The interaction history grouping module 450 may further group the interaction history into two groups, a first group including interaction elements corresponding to the first identified anchor, and a second group including interaction elements corresponding to the second identified anchor.

In the above example, the interaction history grouping module 450 may also be configured to identify the two anchors in the interaction history even if the interaction history related to the two orders overlaps in time. For example, the interaction history grouping module 450 may identify the context for each interaction element in the interaction history and filter the elements into groups or threads based on the context, and identify a first element (e.g., interaction element that is first in time) of each thread as the anchor of the thread. As another example, the interaction history grouping module 450 may determine start of a new thread in the interaction history upon passage of a predetermined period of time. Another example based on which the interaction history grouping module 450 may divide the history into groups or threads may be a determined or specified intent or goal of the agent in having a particular conversation (e.g., agent trying to get a response, agent trying to make a conversion).

Thread navigation module 460 may provide front-end functionality to allow the agent to easily navigate between threads or groups identified by the interaction history grouping module 450 so that an agent can quickly jump from the interaction element corresponding to one anchor to the interaction element corresponding to another anchor without having to manually scroll through the interaction history or try to manually determine while scrolling when the context of a conversation changes to a different topic or issue. For example, based on the identified anchors, the navigation module 460 may present an interface element to enable the agent to easily navigate between anchors in the interaction history and jump through portions of the interaction history directly to an interaction element (e.g., message or action item) where a new conversation with the subscriber started. As another example, the navigation module 460 may also act as a filter that filters the interaction history based on a selected anchor and presents only those interaction elements (e.g., messages or action items) that are identified by grouping module 450 as being related to the selected anchor. Functionality of the thread navigation module 460 may be achieved by designing front-end elements and using HTML, CSS, REACT, etc.

Example Response Platform GUI

Figure 5A:
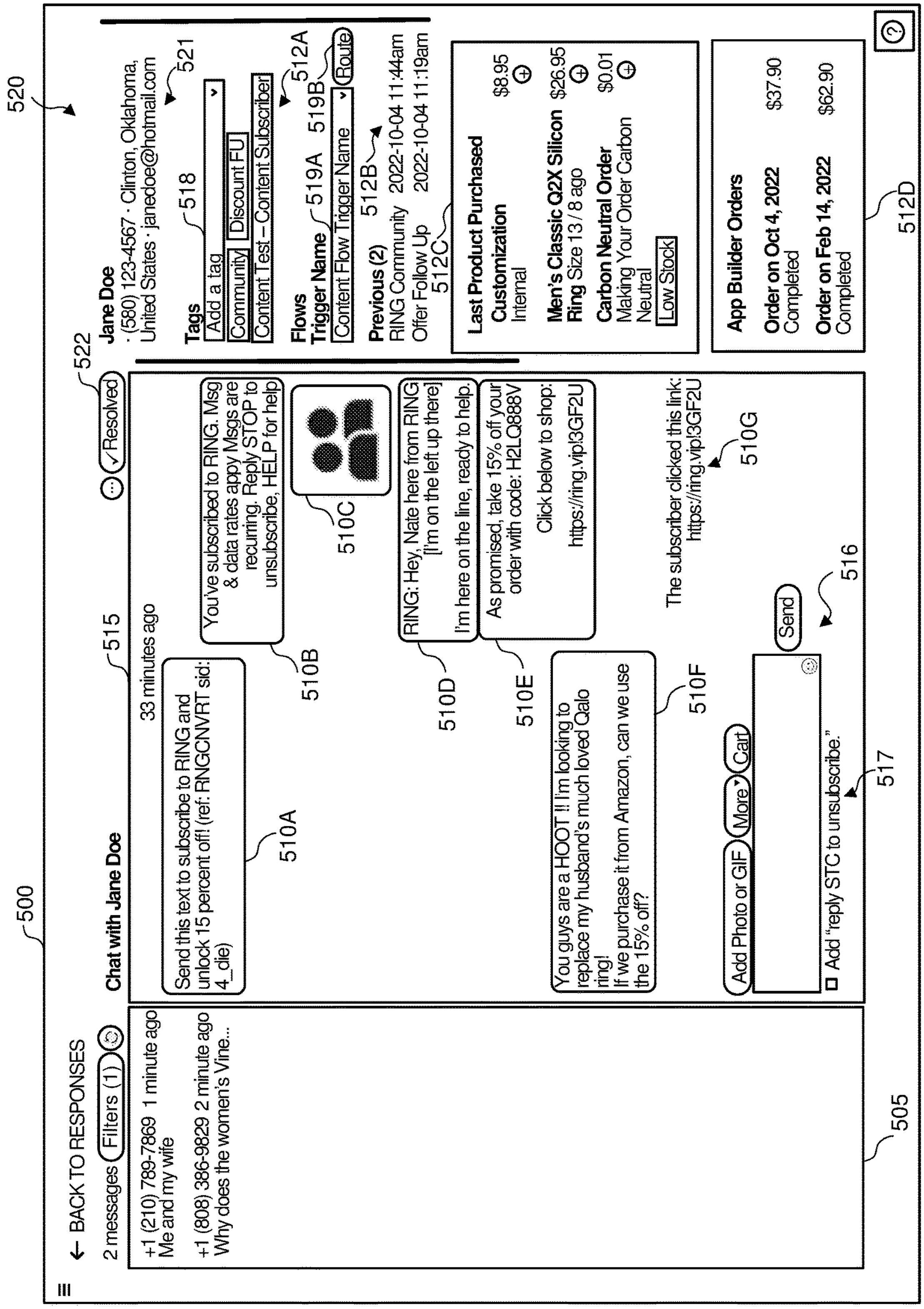
FIGS. 5A-5B are example illustrations of front-end graphical user interfaces of the response platform for an agent of an application operator to interact with a subscriber, in accordance with some embodiments.
Figure 5B:
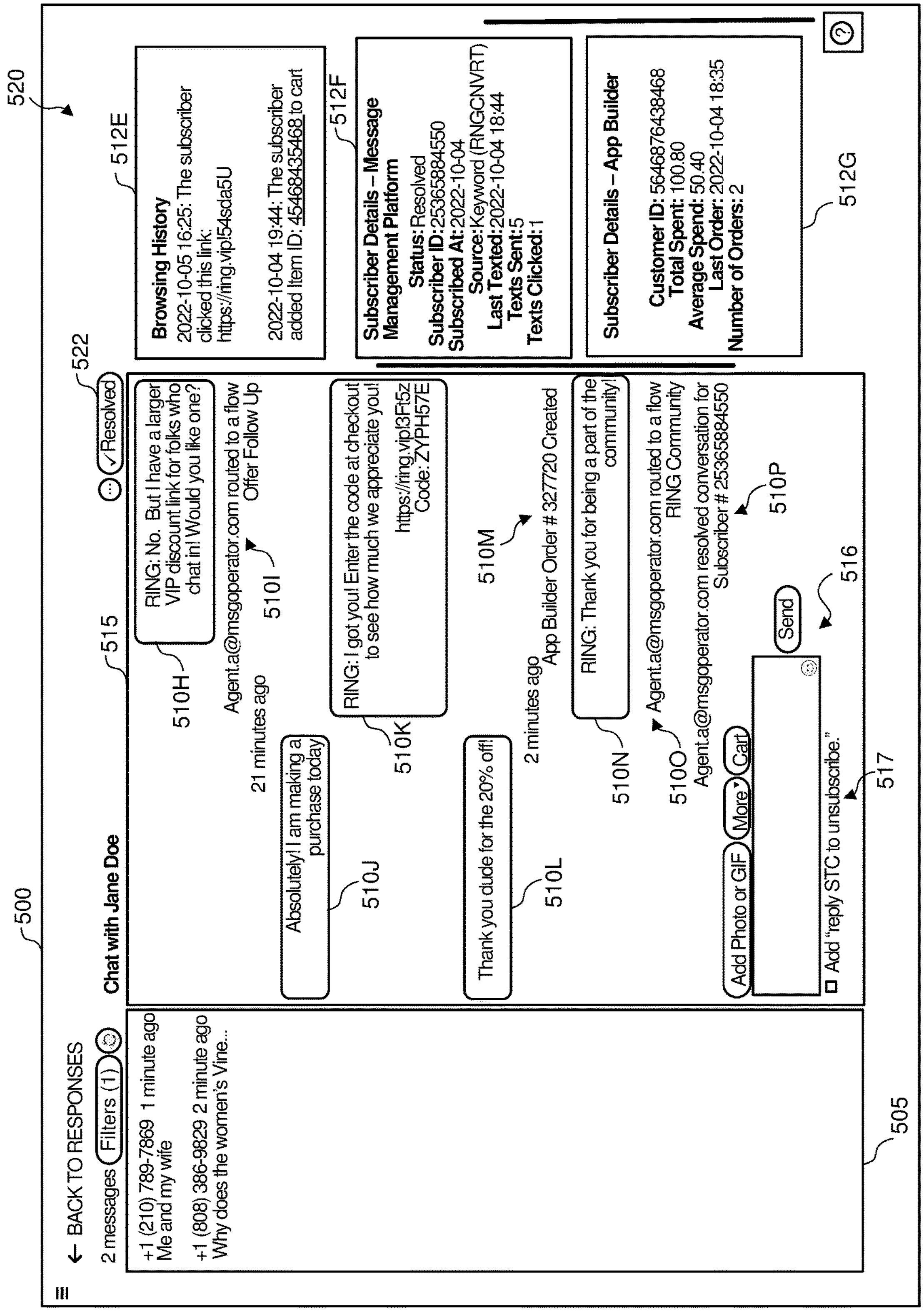

FIGS. 5A and 5B are example illustrations of front-end graphical user interfaces of the response platform 340 for an agent of an application operator 120 to interact with a subscriber, in accordance with some embodiments. FIGS. 5A and 5B illustrate a response interface 500 generated by the response platform 340 for a particular subscriber selected by an agent of the application operator 120 or of the message management platform 110 and acting on behalf of the application operator 120. The response interface 500 may be accessible by the agent upon providing appropriate access credentials associated with the application operator 120 and authenticated by the message management platform 110 based on the application operator credentials managed by the application operator management engine 305. The response interface 500 may be used by the agent (e.g., customer service representative, sales representative) to directly interact with subscribers. Multiple agents may have access to the response interface 500 to simultaneously resolve multiple incoming subscriber messages.

As shown in FIGS. 5A and 5B, the response interface 500 includes a message queue 505 that lists incoming messages from subscribers added to the message queue 505 by the message queueing module 410. An agent may select one of the messages 510A from the message queue 505 for viewing the interaction history 510 (e.g., interaction elements 510A, 510B, . . . , 510P) and contextual information 512 (e.g., context elements 512A, 512B, . . . , 512F) related to the subscriber corresponding to the selected message 510A. An agent interacting with the response interface 500 may toggle between multiple messages from the message queue 505 and switch the view between corresponding interaction histories 510 in a messaging interface 515 and contextual information 512 in an action interface 520.

FIG. 5A shows a state where the agent has selected a message (e.g., interaction element) 510A from the message queue 505. As a result, the response interface 500 displays the interaction history 510 with a subscriber corresponding to the selected message 510A in the messaging interface 515, and further displays context information 512 associated with the subscriber in the action interface 520. Selecting the message 510A from the message queue 505 may cause the interaction history generation module 430 to query the subscriber profile data from the subscriber management engine 310 based on metadata (e.g., phone number) associated with the selected message 510. For example, based on the phone number of the message 510A, the interaction history generation module 430 may identify a subscriber identifier that has the phone number, and further, obtain the entire interaction history 510, the context information 512, and the customer record data 521 associated with the subscriber identifier from the subscriber management engine 310.

In the example shown in FIGS. 5A and 5B, a mapping between a subscriber identifier corresponding to the subscriber associated with the message (interaction element) 510A and a customer identifier of a customer record received as API notifications from the application builder platform 130 may already exist in the API subscription and data engine 315. As a result, the subscriber profile corresponding to message 510A may already include the customer record data 521 that may be received previously from the application builder platform 130. That is, for example, when a message from the number "580-123-4567" is received by the message management platform 110, the interaction history generation module 430 may be able to determine, based on payload data received as API notifications from the application builder platform, that the message is from a known subscriber "Jane Doe" and also determine other information (e.g., email, address, etc.) of the subscriber from the corresponding customer record received from the application builder platform 130.

The messaging interface 515 may include the messaging element 516 for sending text or multimedia messages to the subscriber, and also include other functionality like sending a link to a cart to which an item has been added by the agent for checkout. Element 517 may allow the agent to add a link to a composed message to easily provide the subscriber receiving the message the option to unsubscribe from receiving messages.

The action interface 520 may include tagging element 518 for the agent to add one or more tags (or removing existing tags) to the subscriber's profile. For example, the agent may click on a dropdown to view and select from a list of available tags, and by clicking on a particular tag, add the tag to the subscriber's profile. Tags added to the subscriber's profile by the agent may be listed as context information (context element 512A in the action interface 520.

The action interface 520 may also include flow routing element 519A for the agent to route or enroll the subscriber into one or more message flows (or removing the subscriber from an existing flow). For example, the agent may click on a dropdown to view and select from a list of available message flows, and by selecting a particular flow and operating element 519B, route the subscriber to the selected message flow. The subscriber may now receive one or more messages automatically per the rules of the message flow by operations of the message flow management engine 335, and the sent one or more messages may automatically appear in the messaging interface 515 as interaction elements 510. Message flows the subscriber has been routed to by the agent may be listed as context information (context element 512B) in the action interface 520.

The response interface 500 may also include resolve element 522 for the agent to indicate that the conversation with the subscriber has been resolved. By clicking on element 522, the agent may indicate that no further action needs to be taken with respect to the subscriber. For example, the subscriber may have asked a question and after providing an answer to the question, the agent may operate element 522 to indicate that the issue for which the subscriber contacted the merchant has been resolved. Clicking on the element 522 may cause the generation of a resolve event that in turn causes the interaction history generation module 430 to generate the interaction element 510P in the messaging interface 515.

As shown in FIGS. 5A and 5B, the interaction elements in the interaction history 510 may be of different types. For example, an interaction element may be a sent or received message (e.g., messages 510A, 510B, 510C, 510F, etc.). Interaction element 510A or 510B in the interaction history 510 is an example of a message event generated by the event management engine 330 based on receipt or transmission by the message management platform 110 of a message to/from a subscriber via the messaging interface 515.

As another example, an interaction element in the interaction history 510 may be an action item associated with a user action (e.g., elements 510G and 510M). Interaction element 510G (indicating that the subscriber viewed a particular webpage) is an example of an action item indicating an uncommitted transaction event generated by the event management engine 330 based on receipt by the message management platform 110 of a notification from a code snippet 144 of an application 142 running on a user computing device 140 associated with the subscriber, as previously described. Interaction element 510M (indicating that the subscriber placed a particular order with the application builder platform 130 that provides e-commerce backend functionality to the application operator 120) is an example of an action item indicating a committed transaction event generated by the event management engine 330 based on receipt by the message management platform 110 of an API notification from the application builder platform 130, as previously described.

As another example, an interaction element in the interaction history 510 may be an action item associated with an agent action (e.g., elements 5101, 5100, and 510P). Interaction elements 5101 and 5100 (indicating that a particular agent routed (enrolled) the subscriber to particular message flows) are examples of action items indicating an agent action event (flow event) generated by the event management engine 330 based on an agent action, e.g., via the flow routing elements 519A and 519B, to route the subscriber to one or more message flows, as previously described.

Interaction element 510P (indicating that a particular agent indicated the conversation for the subscriber as being resolved) is an example of an action item indicating an agent action event (issue resolved event) generated by the event management engine 330 based on an agent action, e.g., via the resolve element 522, to indicate that the conversation with the subscriber has been resolved, as previously described. After the agent operates on the resolve element 522, thereby generating the issue resolved event and the appearance of the interaction element 510P in the interaction history 510, if more messages are exchanged between the subscriber and the agent, or if additional user actions or agent actions are undertaken, corresponding events may be generated by the event management engine 330 and corresponding interaction elements may appear in the interaction history 510 subsequent to interaction element 510P, and the entire interaction history 510 beginning from the interaction element 510A to interaction elements subsequent to the resolve interaction element 510P may be presented and navigable in the messaging interface 515 to the agent. The agent may thus be able to navigate through multiple conversations (each of them concluding with the agent indicating that the conversation has been resolved by operating the resolve element 522) in the same messaging interface 515. In conventional "ticket" based systems, an agent has to browse through separate tickets to view the interaction with the customer for which each ticket has been created. For example, the agent may not be able to view past interactions corresponding to past tickets after the tickets have been "closed". That is, the agent may only be able to view the interactions corresponding to the current open ticket). By contrast, with the response interface 500 of the present disclosure, the agent is able to browse through the entire interaction history (and view time-correlated user/agent actions) with the customer (which may include multiple conversations (e.g., multiple "tickets" include past "closed" tickets)) in the same timeline.

As shown in FIGS. 5A and 5B, the interaction history is presented in the messaging interface 515 as a chronological timeline of interaction elements 510 that may be of different types (e.g., messages, user actions received as API notifications from a server, user actions received as code snippet or cookie-tracked notifications from a user device, agent actions performed via the response interface 500, and the like). The interaction history 510 may be the entire interaction history of interactions between the subscriber and the merchant. Further, in presenting the interaction elements 510 (that include elements from different data sources) chronologically, the chronological relationship between, e.g., sending of a promotional offer as a message, and the user placing an order on the application builder platform or adding an item to a shopping cart using the application on their computing device, is preserved and the information presented to the agent in an easy-to-understand interface. As a result, the agent does not need to switch back and forth between different applications or compare the relative timing of actions or messages to understand the interrelationships between messages, events, actions, etc. The agent can quickly and easily learn the context of the interactions with the subscriber while viewing and operating on the same/single response interface. The response interface 500 thus provides an information rich and contextual view that streamlines and simplifies the job of the agent and allows to the agent to identify and take appropriate steps (e.g., send a promotional message, route to a flow, unsubscribe a user, etc.) while understanding the full context of the relationship with the subscriber.

Further, as shown in FIGS. 5A and 5B, the context information presented on the action interface 520 may provide additional context to the agent in determining how to "resolve" the conversation with the subscriber, or how or what agent actions to take to achieve an intended goal. The context information may be generated by the context information generation module 435 as context elements 512 of different types. As shown in FIGS. 5A and 5B, the context elements 512 may include context elements based on agent actions (e.g., context elements 512A, 512B), context elements based on user actions associated with committed transaction events (e.g., context elements 512C, 512D, 512G), and context elements based on user actions associated with uncommitted transaction events (e.g., context elements 512E, 512F). The context elements based on user actions associated with committed transaction events may be based on API notification data received from the application builder platform 130. The context elements based on user actions associated with uncommitted transaction events may be based on cookie-tracked data received from applications 142 running on user computing devices 140.

Although not specifically shown in FIGS. 5A and 5B, the response interface 500 may also include features (based on the functionality described above in connection with the interaction history grouping module 450, and the thread navigation module 460) that allows the agent to easily navigate between start of different threads of conversations within the entire interaction history with the same subscriber. For example, the agent may be able to click (or perform another input operation) on the first order ("Order on Oct. 4, 2022") listed in the context element 512D and view in the messaging interface 515, the start of the interaction history (i.e., one or more corresponding interaction elements 510) corresponding to the selected first order. Similarly, the agent may be able to click (or perform another input operation) on the second order ("Order on Feb. 14, 2022") listed in the context element 512D and view in the messaging interface 515, the start of the interaction history (i.e., one or more corresponding interaction elements 510) corresponding to the selected second order, without having to manually scroll through the entire interaction history that is presented in the messaging interface 515, and look for a message or other action item that corresponds to the start of the respective orders.

In some embodiments, each conversation (having a corresponding agent generated resolve interaction element) may correspond to a group of interaction elements and corresponding events, and the interaction history grouping module 450 may group the interaction elements based on the occurrence of the interaction element corresponding to the agent's operation of the resolve element 522. The thread navigation module 460 may enable the agent to jump from one thread to the next based on each occurrence of the interaction element corresponding to the agent's operation of the resolve element 522.

Example Process

Figure 6:
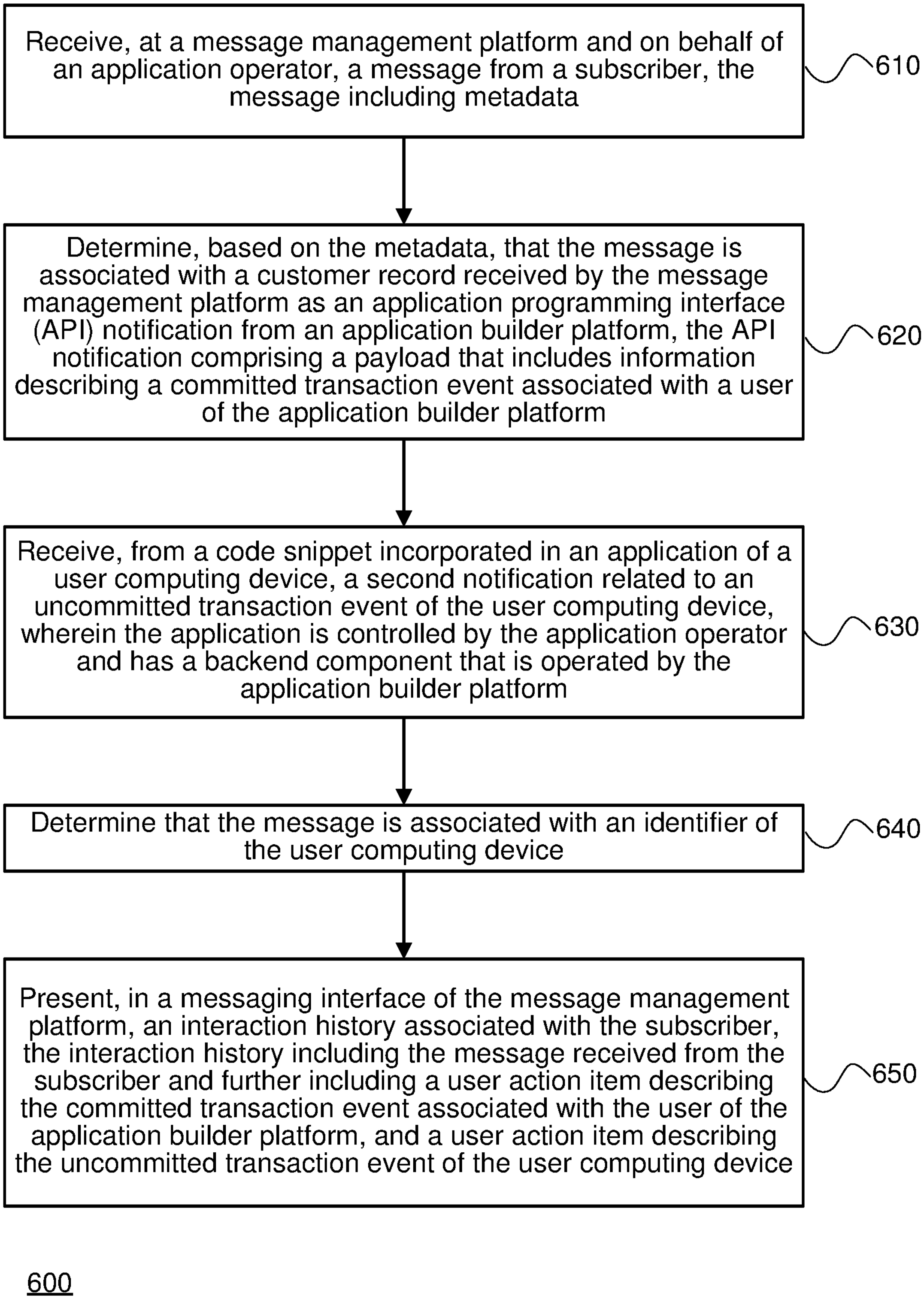
FIG. 6 is a flowchart depicting an example process for presenting an interaction history with a subscriber in a response interface, in accordance with some embodiments.

FIG. 6 is a flowchart depicting an example process 600 for presenting an interaction history with a subscriber in a response interface, in accordance with some embodiments. The process 600 may be performed by one or more servers of the message management platform 110. The process 600 may be embodied as a software algorithm that may be stored as computer instructions that are executable by one or more processors. The instructions, when executed by the processors, cause the processors to perform various steps in the process 600. In various embodiments, the process 600 may include additional, fewer, or different steps.

The message management platform 110 may receive 610 on behalf of an application operator 120, a message (e.g., message 510A in FIG. 5A) from a subscriber, the message including metadata (e.g., phone number of subscriber). The message management platform 110 may determine 620, based on the metadata, that the message is associated with a customer record (e.g., customer record 521 in FIG. 5A) received by the message management platform 110 as an application programming interface (API) notification (e.g., see FIG. 2B) from an application builder platform 130, the API notification comprising a payload that includes information describing a committed transaction event (e.g., receive API notification corresponding to one of the orders listed in context element 512D in FIG. 5A) associated with a user of the application builder platform 130.

The message management platform 110 may receive 630, from a code snippet 144 incorporated in an application 142 of a user computing device 140, a second notification related to an uncommitted transaction event (e.g., receive notification corresponding to one of the browsing history events listed in context element 512E in FIG. 5B) of the user computing device 140, wherein the application 142 is controlled by the application operator 120 and has a backend component that is operated by the application builder platform 130. The message management platform 110 may determine 640 that the message is associated with an identifier of the user computing device (e.g., based on a unique link sent to the subscriber and/or based on key value pairs (e.g., device identifier, subscriber identifier, application identifier, cookie identifier, code snipped identifier) included in the received notification payload).

The message management platform 110 may present 650, in a messaging interface (e.g., 515 of FIGS. 5A-B) of the message management platform 110, an interaction history 510 associated with the subscriber, the interaction history including the message (e.g., 510A) received from the subscriber and further including a user action item describing the committed transaction event (e.g., 510M in FIG. 5B) associated with the user of the application builder platform, and a user action item describing the uncommitted transaction event (e.g., 510G in FIG. 5A) of the user computing device 140.

Computing Machine Architecture

Figure 7:
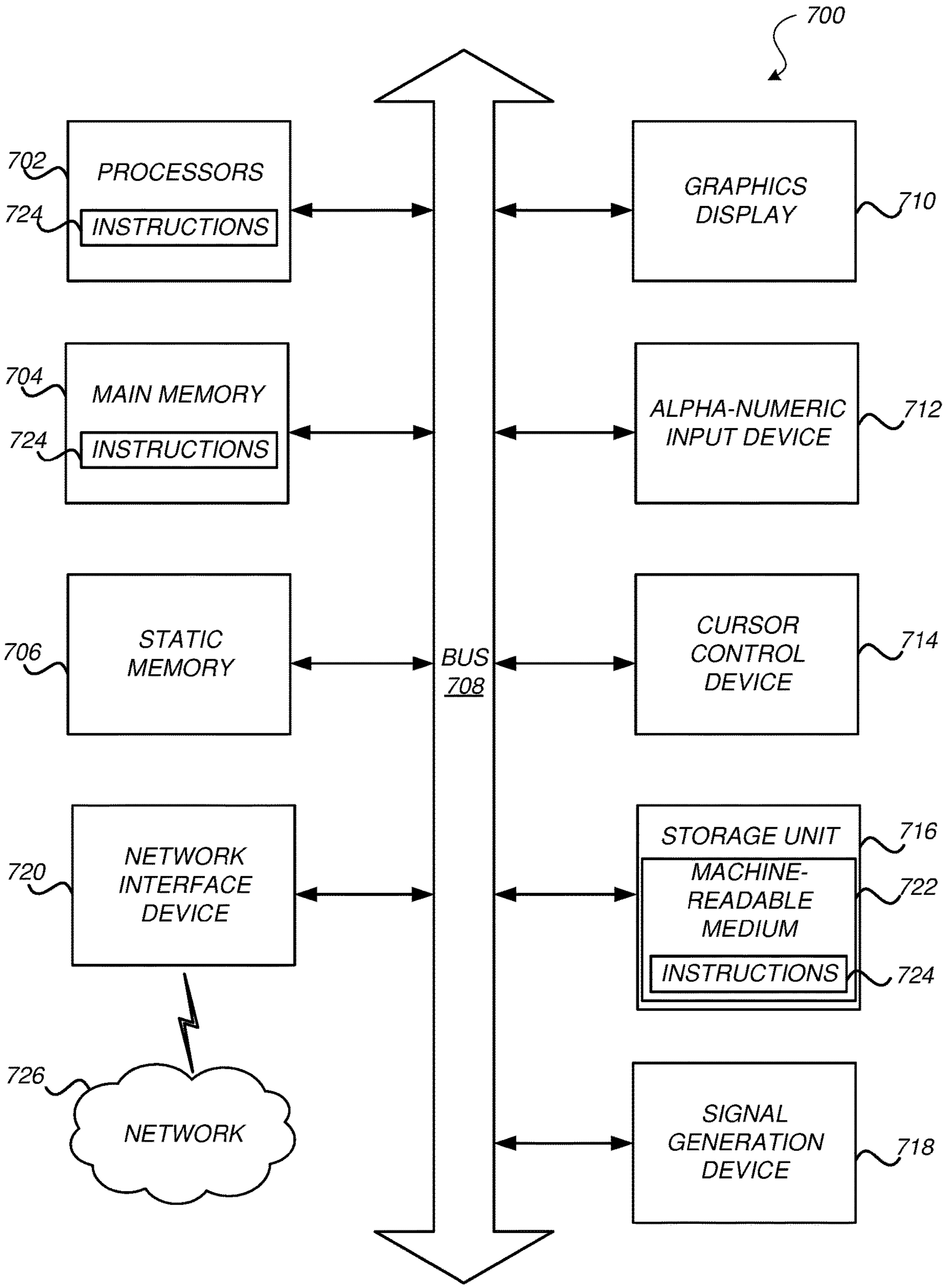
FIG. 7 is a block diagram illustrating components of an example computing machine, in accordance with some embodiments.

FIG. 7 is a block diagram illustrating components of an example computing machine that is capable of reading instructions from a computer-readable medium and execute them in a processor (or controller). A computer described herein may include a single computing machine shown in FIG. 7, a virtual machine, a distributed computing system that includes multiples nodes of computing machines shown in FIG. 7, or any other suitable arrangement of computing devices.

By way of example, FIG. 7 shows a diagrammatic representation of a computing machine in the example form of a computer system 700 within which instructions 724 (e.g., software, source code, program code, bytecode, or machine code), which may be stored in a computer-readable medium for causing the machine to perform any one or more of the processes discussed herein may be executed. In some embodiments, the computing machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The structure of a computing machine described in FIG. 7 may correspond to any software, hardware, or combined components shown in FIGS. 1, 2A, 3, and 4 including but not limited to, the message management platform 110, the application builder platform 130, the user computing device 140 and various engines, interfaces, terminals, modules, and machines shown in FIGS. 3 and 4. While FIG. 7 shows various hardware and software elements, each of the components described in FIGS. 1, 2A, 3, and 4 may include additional or fewer elements. Further, the instructions may correspond to the functionality of components and interfaces described with FIGS. 1-5.

By way of example, a computing machine may be a personal computer (PC), a tablet PC, a set-top box (STB), a personal digital assistant (PDA), a cellular telephone, a smartphone, a web appliance, a network router, an internet of things (IOT) device, a switch or bridge, or any machine capable of executing instructions 724 that specify actions to be taken by that machine. Further, while only a single machine is illustrated, the term "machine" and "computer" may also be taken to include any collection of machines that individually or jointly execute instructions 724 to perform any one or more of the methodologies discussed herein.

The example computer system 700 includes one or more processors 702 such as a CPU (central processing unit), a GPU (graphics processing unit), a TPU (tensor processing unit), a DSP (digital signal processor), a system on a chip (SOC), a controller, a state machine, an application-specific integrated circuit (ASIC), a field-programmable gate array (FPGA), or any combination of these. Parts of the computing system 700 may also include a memory 704 that store computer code including instructions 724 that may cause the processors 702 to perform certain actions when the instructions are executed, directly or indirectly by the processors 702. Instructions can be any directions, commands, or orders that may be stored in different forms, such as equipment-readable instructions, programming instructions including source code, and other communication signals and orders. Instructions may be used in a general sense and are not limited to machine-readable codes.

One and more methods described herein improve the operation speed of the processors 702 and reduces the space required for the memory 704. For example, the methods described herein reduce the complexity of the computation of the processors 702 by applying one or more novel techniques that simplify the steps in training, reaching convergence, and generating results of the processors 702. The algorithms described herein also reduces the size of the models and datasets to reduce the storage space requirement for memory 704.

The performance of certain of the operations may be distributed among the more than processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations. Even though in the specification or the claims may refer some processes to be performed by a processor, this should be construed to include a joint operation of multiple distributed processors.

The computer system 700 may include a main memory 704, and a static memory 706, which are configured to communicate with each other via a bus 708. The computer system 700 may further include a graphics display unit 710 (e.g., a plasma display panel (PDP), a liquid crystal display (LCD), a projector, or a cathode ray tube (CRT)). The graphics display unit 710, controlled by the processors 702, displays a GUI (GUI) to display one or more results and data generated by the processes described herein. The computer system 700 may also include an alphanumeric input device 712 (e.g., a keyboard), a cursor control device 714 (e.g., a mouse, a trackball, a joystick, a motion sensor, or another pointing instrument), a storage unit 716 (a hard drive, a solid state drive, a hybrid drive, a memory disk, etc.), a signal generation device 718 (e.g., a speaker), and a network interface device 720, which also are configured to communicate via the bus 708.

The storage unit 716 includes a computer-readable medium 722 on which is stored instructions 724 embodying any one or more of the methodologies or functions described herein. The instructions 724 may also reside, completely or at least partially, within the main memory 704 or within the processor 702 (e.g., within a processor's cache memory) during execution thereof by the computer system 700, the main memory 704 and the processor 702 also constituting computer-readable media. The instructions 724 may be transmitted or received over a network 726 via the network interface device 720.

While computer-readable medium 722 is shown in an example embodiment to be a single medium, the term "computer-readable medium" should be taken to include a single medium or multiple media (e.g., a centralized or distributed database, or associated caches and servers) able to store instructions (e.g., instructions 724). The computer-readable medium may include any medium that is capable of storing instructions (e.g., instructions 724) for execution by the processors (e.g., processors 702) and that causes the processors to perform any one or more of the methodologies disclosed herein. The computer-readable medium may include, but not be limited to, data repositories in the form of solid-state memories, optical media, and magnetic media. The computer-readable medium does not include a transitory medium such as a propagating signal or a carrier wave.

ADDITIONAL CONSIDERATIONS

Beneficially, various embodiments described herein provide integration to application building ecosystem that allows application operators to effectively communicate with the end users of the applications while allowing the application operators to enhance the functionalities of their applications by incorporating various third-party read-to-use features. Various disclosed embodiments allow a message management platform to effectively communicate with any third-party platforms that provide features to the applications and distribute messages based on triggers that occur at the third-party platforms. This streamlines the application building process and enhance communication capability for application operators.

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Embodiments according to the invention are in particular disclosed in the attached claims directed to a method and a computer program product, wherein any feature mentioned in one claim category, e.g., method, can be claimed in another claim category, e.g. computer program product, system, storage medium, as well. The dependencies or references back in the attached claims are chosen for formal reasons only. However, any subject matter resulting from a deliberate reference back to any previous claims (in particular multiple dependencies) can be claimed as well, so that any combination of claims and the features thereof is disclosed and can be claimed regardless of the dependencies chosen in the attached claims. The subject-matter which can be claimed comprises not only the combinations of features as set out in the disclosed embodiments but also any other combination of features from different embodiments. Various features mentioned in the different embodiments can be combined with explicit mentioning of such combination or arrangement in an example embodiment. Furthermore, any of the embodiments and features described or depicted herein can be claimed in a separate claim and/or in any combination with any embodiment or feature described or depicted herein or with any of the features.

Some portions of this description describe the embodiments in terms of algorithms and symbolic representations of operations on information. These operations and algorithmic descriptions, while described functionally, computationally, or logically, are understood to be implemented by computer programs or equivalent electrical circuits, microcode, or the like. Furthermore, it has also proven convenient at times, to refer to these arrangements of operations as engines, without loss of generality. The described operations and their associated engines may be embodied in software, firmware, hardware, or any combinations thereof.

Any of the steps, operations, or processes described herein may be performed or implemented with one or more hardware or software engines, alone or in combination with other devices. In some embodiments, a software engine is implemented with a computer program product comprising a computer-readable medium containing computer program code, which can be executed by a computer processor for performing any or all of the steps, operations, or processes described. The term "steps" does not mandate or imply a particular order. For example, while this disclosure may describe a process that includes multiple steps sequentially with arrows present in a flowchart, the steps in the process do not need to be performed by the specific order claimed or described in the disclosure. Some steps may be performed before others even though the other steps are claimed or described first in this disclosure.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. In addition, the term "each" used in the specification and claims does not imply that every or all elements in a group need to fit the description associated with the term "each." For example, "each member is associated with element A" does not imply that all members are associated with an element A. Instead, the term "each" only implies that a member (of some of the members), in a singular form, is associated with an element A.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights.

The invention claimed is:

1. A computer-implemented method, comprising:

receiving, at a message management platform and on behalf of an application operator, a message from a subscriber, the message including metadata;

determining, based on the metadata, that the message is associated with an application programming interface (API) notification received by the message management platform from an application builder platform, the API notification comprising a payload that includes information describing a committed transaction event associated with the subscriber;

adding the message to a message queue in a response interface that is presented to the application operator for interacting with subscribers;

in response to receiving from the application operator a selection of the message in the message queue, generating the response interface to include an action interface and a messaging interface, wherein the action interface comprises: (i) an interactive tagging element for receiving input from the application operator instructing the response interface to add or remove tags from a profile of the subscriber; and (ii) an interactive flow routing element for receiving input from the application operator instructing the response interface to enroll the subscriber into a particular message flow, wherein the messaging interface comprises a display of a plurality of interaction elements associated with the subscriber, the plurality of interaction elements including at least the message received from the subscriber and a user action item describing the committed transaction event associated with the subscriber, wherein the plurality of interaction elements are arranged in a chronological order of occurrence and according to instructions received from the interactive tagging element and the interactive flow routing element; and displaying the response interface to the application operator.

2. The computer-implemented method of claim 1, further comprising:

receiving, from a code snippet incorporated in an application running on a user computing device, a second notification related to an uncommitted transaction event of the user computing device, wherein the application is controlled by the application operator and has a backend component that is operatated by the application builder platform; and determining that the message is associated with an identifier of the user computing device;

wherein the plurality of interaction elements displayed in the messaging interface further include a user action item describing the uncommitted transaction event of the user computing device.

3. The computer-implemented method of claim 2, further comprising:

transmitting, using the messaging interface and to the subscriber, a message including a link; and determining that the uncommitted transaction event of the user computing device is associated with the link included in the message based on an identifier of the link, wherein the message from the subscriber is determined to be associated with the identifier of the user computing device based on the uncommitted transaction event of the user computing device being determined to be associated with the link.

4. The computer-implemented method of claim 2, wherein the uncommitted transaction event is associated with a browsing history of a user of the user computing device, browsing items on the application controlled by the application operator.

5. The computer-implemented method of claim 2, method further comprising:

presenting a first context element in the action interface, the first context element generated based on the committed transaction event associated with the API notification received from the application builder platform; and presenting a second context element in the action interface, the second context element generated based on the uncommitted transaction event associated with the second notification received from the user computing device.

6. The computer-implemented method of claim 5, wherein the plurality of interaction elements displayed in the messaging interface further include a first agent action item describing the instruction received from the interactive tagging element to add or remove tags from the profile of the subscriber and a second agent action item describing the instruction received from the interactive flow routing element to enroll the subscriber into the particular message flow.

7. The computer-implemented method of claim 6, wherein the plurality of interaction elements displayed in the messaging interface further include a message sent to the subscriber by the application operator.

8. The computer-implemented method of claim 2, wherein the committed transaction event is associated with a purchase order received by the application builder platform from the subscriber via the application controlled by the application operator.

9. The computer-implemented method of claim 1, further comprising:

grouping the plurality of interaction elements into a plurality of threads based on respective identified anchors; and navigating directly from a first one of the plurality of threads to a start of a second one of the plurality of threads based on input received from the application operator.

10. The computer-implemented method of claim 1, wherein the message is determined to be associated with the API notification based on a phone number of the received message.

11. A message management platform comprising:

one or more processors; and memory, the memory configured to store code comprising instructions, wherein the instructions, when executed by the one or more processors, cause the one or more processors to perform steps comprising:

receiving, on behalf of an application operator, a message from a subscriber, the message including metadata;

determining, based on the metadata, and the information describing the event, that the message is associated with an application programming interface (API) notification received from an application builder platform, the API notification comprising a payload that includes information describing a committed transaction event associated with the subscriber;

adding the message to a message queue in a response interface that is presented to the application operator for interacting with subscribers;

in response to receiving from the application operator a selection of the message in the message queue, generating the response interface to include an action interface and a messaging interface, wherein the action interface comprises: (i) an interactive tagging element for receiving input from the application operator instructing the response interface to add or remove tags from a profile of the subscriber; and (ii) an interactive flow routing element for receiving input from the application operator instructing the response interface to enroll the subscriber into a particular message flow, wherein the messaging interface comprises a display of a plurality of interaction elements associated with the subscriber, the plurality of interaction elements including at least the message received from the subscriber and a user action item describing the committed transaction event associated with the subscriber, wherein the plurality of interaction elements are arranged in a chronological order of occurrence and according to instructions received from the interactive tagging element and the interactive flow routing element; and displaying the response interface to the application operator.

12. The message management platform of claim 11, wherein the instructions, when executed by the one or more processors, further cause the one or more processors to perform steps comprising:

receiving, from a code snippet incorporated in an application running on a user computing device, a second notification related to an uncommitted transaction event of the user computing device, wherein the application is controlled by the application operator and has a backend component that is operatated by the application builder platform; and determining that the message is associated with an identifier of the user computing device;

wherein the plurality of interaction elements displayed in the messaging interface further include a user action item describing the uncommitted transaction event of the user computing device.

13. The message management platform of claim 12, wherein the instructions, when executed by the one or more processors, further cause the one or more processors to perform steps comprising:

transmitting, using the messaging interface and to the subscriber, a message including a link; and determining that the uncommitted transaction event of the user computing device is associated with the link included in the message based on an identifier of the link, wherein the message from the subscriber is determined to be associated with the identifier of the user computing device based on the uncommitted transaction event of the user computing device being determined to be associated with the link.

14. The message management platform of claim 12, wherein the uncommitted transaction event is associated with a browsing history of a user of the user computing device, browsing items on the application controlled by the application operator.

15. The message management platform of claim 12, wherein the instructions, when executed by the one or more processors, further cause the one or more processors to perform steps comprising:

presenting a first context element in the action interface, the first context element generated based on the committed transaction event associated with the API notification received from the application builder platform; and presenting a second context element in the action interface, the second context element generated based on the uncommitted transaction event associated with the second notification received from the user computing device.

16. The message management platform of claim 15, wherein the plurality of interaction elements displayed in the messaging interface further include a first agent action item describing the instruction received from the interactive tagging element to add or remove tags from the profile of the subscriber and a second agent action item describing the instruction received from the interactive flow routing element to enroll the subscriber into the particular message flow.

17. The message management platform of claim 12, wherein the committed transaction event is associated with a purchase order received by the application builder platform from the subscriber via the application controlled by the application operator.

18. The message management platform of claim 11, wherein the instructions, when executed by the one or more processors, further cause the one or more processors to perform steps comprising:

grouping the plurality of interaction elements into a plurality of threads based on respective identified anchors; and navigating directly from a first one of the plurality of threads to a start of a second one of the plurality of threads based on input received from the application operator.

19. The message management platform of claim 11, wherein the message is determined to be associated with the API notification based on a phone number of the received message.

20. A non-transitory computer-readable medium comprising instructions that, when executed by one or more processors, cause the one or more processors to perform steps comprising:

receiving, at a message management platform and on behalf of an application operator, a message from a subscriber, the message including metadata;

determining, based on the metadata, that the message is associated with an application programming interface (API) notification received by the message management platform from an application builder platform, the API notification comprising a payload that includes information describing a committed transaction event associated with the subscriber;

adding the message to a message queue in a response interface that is presented to the application operator for interacting with subscribers;

in response to receiving from the application operator a selection of the message in the message queue, generating the response interface to include an action interface and a messaging interface, wherein the action interface comprises: (i) an interactive tagging element for receiving input from the application operator instructing the response interface to add or remove tags from a profile of the subscriber; and (ii) an interactive flow routing element for receiving input from the application operator instructing the response interface to enroll the subscriber into a particular message flow, wherein the messaging interface comprises a display of a plurality of interaction elements associated with the subscriber, the plurality of interaction elements including at least the message received from the subscriber and a user action item describing the committed transaction event associated with the subscriber, wherein the plurality of interaction elements are arranged in a chronological order of occurrence and according to instructions received from the interactive tagging element and the interactive flow routing element; and displaying the response interface to the application operator.

21. The non-transitory computer-readable medium of claim 20, wherein the instructions further cause the one or more processors to perform steps comprising:

receiving, from a code snippet incorporated in an application running on a web browser of a user computing device, a second notification related to an uncommitted transaction event of the user computing device, wherein the application is controlled by the application operator and has a backend component that is operatated by the application builder platform; and determining that the message is associated with an identifier of the user computing device;

wherein the plurality of interaction elements displayed in the messaging interface further include a user action item describing the uncommitted transaction event of the user computing device.

22. The non-transitory computer-readable medium of claim 21, wherein the instructions further cause the one or more processors to perform steps comprising:

transmitting, using the messaging interface and to the subscriber, a short message service (SMS) message including a link; and determining that the uncommitted transaction event of the user computing device is associated with the link included in the SMS message based on a user clicking on the link, wherein the SMS message from the subscriber is determined to be associated with the identifier of the user computing device based on the determination.

23. The non-transitory computer-readable medium of claim 21, wherein the uncommitted transaction event is associated with a browsing history of a user of the user computing device, browsing items on the application via a web browser.

24. The non-transitory computer-readable medium of claim 21, wherein the instructions further cause the one or more processors to perform steps comprising:

presenting a first context element in the action interface, the first context element generated based on the committed transaction event associated with the API notification received from the application builder platform; and presenting a second context element in the action interface, the second context element generated based on the uncommitted transaction event associated with the second notification received from the user computing device.

25. The non-transitory computer-readable medium of claim 24, wherein the plurality of interaction elements displayed in the messaging interface further include a first agent action item describing the instruction received from the interactive tagging element to add or remove tags from the profile of the subscriber and a second agent action item describing the instruction received from the interactive flow routing element to enroll the subscriber into the particular message flow.

26. The non-transitory computer-readable medium of claim 25, wherein the plurality of interaction elements displayed in the messaging interface further include a message sent to the subscriber by the application operator.

27. The non-transitory computer-readable medium of claim 21, wherein the committed transaction event is a purchase order received by the application builder platform from the subscriber via a web browser accessing the application.

28. The non-transitory computer-readable medium of claim 20, wherein the instructions further cause the one or more processors to perform steps comprising:

grouping the plurality of interaction elements into a plurality of threads based on respective identified anchors; and navigating directly from a first one of the plurality of threads to a start of a second one of the plurality of threads based on input received from the application operator.

29. The non-transitory computer-readable medium of claim 20, wherein the message is an SMS message, and wherein the SMS message is determined to be associated with the API notification based on a phone number of the received message.

* * * * *

UNITED STATES PATENT AND TRADEMARK OFFICE

CERTIFICATE OF CORRECTION

PATENT NO. : 12,086,775 B2
APPLICATION NO. : 18/112427
DATED : September 10, 2024
INVENTOR(S) : Turner et al.

It is certified that error appears in the above-identified patent and that said Letters Patent is hereby corrected as shown below:

In the Claims

In Column 34, in Claim 2, Line 1, delete “operatated” and insert -- operated --, therefor.

In Column 34, in Claim 5, Line 28, after “claim 2,” delete “method”.

In Column 35, in Claim 11, Lines 15-16, after “metadata,” delete “and the information describing the event,”.

In Column 35, in Claim 12, Line 60, delete “operatated” and insert -- operated --, therefor.

In Column 37, in Claim 21, Lines 46-47, delete “operatated” and insert -- operated --, therefor.

Signed and Sealed this
Fourteenth Day of January, 2025

Derrick Brent
*Acting Director of the United States Patent and Trademark Office*